US009535975B2

(12) United States Patent
Bornhoevd et al.

(10) Patent No.: US 9,535,975 B2
(45) Date of Patent: Jan. 3, 2017

(54) PARALLEL PROGRAMMING OF IN MEMORY DATABASE UTILIZING EXTENSIBLE SKELETONS

(71) Applicant: SAP SE, Walldorf (DE)

(72) Inventors: Christof Bornhoevd, Belmont, CA (US); Wolfgang Lehner, Walldorf (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/712,009

(22) Filed: May 14, 2015

(65) Prior Publication Data

US 2015/0248474 A1    Sep. 3, 2015

Related U.S. Application Data

(63) Continuation of application No. 13/924,105, filed on Jun. 21, 2013, now Pat. No. 9,063,710.

(51) Int. Cl.
*G06F 9/44* (2006.01)
*G06F 17/30* (2006.01)

(52) U.S. Cl.
CPC ........... *G06F 17/30598* (2013.01); *G06F 8/20* (2013.01); *G06F 8/314* (2013.01); *G06F 17/30445* (2013.01); *G06F 17/30864* (2013.01); *G06F 17/30941* (2013.01)

(58) Field of Classification Search
None
See application file for complete search history.

(56) References Cited

U.S. PATENT DOCUMENTS

| 5,781,777 | A | 7/1998 | Sato et al. |
| 6,681,230 | B1 * | 1/2004 | Blott .......................... G06F 8/38 |
| 7,574,424 | B2 | 8/2009 | Chowdhun |
| 7,797,691 | B2 | 9/2010 | Cockx et al. |

(Continued)

OTHER PUBLICATIONS

"Massively Parallel Databases and MapReduce Systems". Babu et al., Foundations and Trends in Databases vol. 5, No. 1 (2012) 1-104.*

(Continued)

*Primary Examiner* — Daxin Wu
(74) *Attorney, Agent, or Firm* — Fountainhead Law Group P.C.

(57) ABSTRACT

An execution framework allows developers to write sequential computational logic, constrained for the runtime system to efficiently parallelize execution of custom business logic. The framework can be leveraged to overcome limitations in executing low level procedural code, by empowering the system runtime environment to parallelize this code. Embodiments employ algorithmic skeletons in the realm of optimizing/executing data flow graphs of database management systems. By providing an extensible set of algorithmic skeletons the developer of custom logic can select the skeleton appropriate for new custom logic, and then fill in the corresponding computation logic according to the structural template of the skeleton. The skeleton provides a set of constraints known to the execution environment, that can be leveraged by the optimizer and the execution environment to generate parallel optimized execution plans containing custom logic, without the developer having to explicitly describe parallelization of the logic.

17 Claims, 22 Drawing Sheets

(56) References Cited

U.S. PATENT DOCUMENTS

| | | | |
|---|---|---|---|
| 7,885,969 | B2 | 2/2011 | Natarajan et al. |
| 8,209,664 | B2 | 6/2012 | Yu et al. |
| 8,316,355 | B2 | 11/2012 | Feng et al. |
| 8,321,476 | B2 | 11/2012 | Kirk et al. |
| 8,365,136 | B2 | 1/2013 | Kowalkiewicz et al. |
| 8,381,224 | B2 * | 2/2013 | Huetter ............. G06F 9/5066 707/607 |
| 8,448,155 | B2 | 5/2013 | Bordelon et al. |
| 8,954,418 | B2 | 2/2015 | Faerber et al. |
| 2004/0010502 | A1 | 1/2004 | Bomfim et al. |
| 2004/0010753 | A1 | 1/2004 | Salter et al. |
| 2004/0230584 | A1 * | 11/2004 | Nouri ............. G06F 17/30513 |
| 2005/0097528 | A1 | 5/2005 | Chakrabarti et al. |
| 2006/0288335 | A1 | 12/2006 | Goglin et al. |
| 2008/0098375 | A1 | 4/2008 | Isard |
| 2010/0131444 | A1 | 5/2010 | Gottlieb et al. |
| 2010/0241827 | A1 | 9/2010 | Yu et al. |
| 2011/0023016 | A1 | 1/2011 | Khader et al. |
| 2011/0040744 | A1 * | 2/2011 | Haas ............. G06F 17/30445 707/713 |
| 2011/0167245 | A1 | 7/2011 | Lavrov et al. |
| 2012/0151462 | A1 | 6/2012 | Joisha et al. |
| 2012/0284228 | A1 | 11/2012 | Ghosh et al. |
| 2013/0282746 | A1 * | 10/2013 | Balko ............. G06Q 10/067 707/758 |
| 2013/0318119 | A1 * | 11/2013 | Dalal ............. G06F 13/16 707/769 |
| 2014/0101177 | A1 * | 4/2014 | Saito ............. G06F 17/30303 707/755 |
| 2014/0372428 | A1 | 12/2014 | Mathis et al. |

OTHER PUBLICATIONS

"MapReduce: Simplified Data Processing on Large Clusters", Dean et al., Communications of the ACM Jan. 2008/vol. 51, No. 1.*

Duncan K. G. Campbell. "Towards the classification of algorithmic skeletons." Technical Report YCS 276, Department of Computer Science, University of York, UK, 1996.

Murray Cole. "Bringing skeletons out of the closet: a pragmatic manifesto for skeletal parallel programming." Parallel Computing, 30(3):389-406, 2004.

Jeffrey Dean and Sanjay Ghemawat. "Mapreduce: Simplified data processing on large clusters." In 6th Symposium on Operating System Design and Implementation (OSDI 2004), San Francisco, California, US, pp. 137-150, 2004.

Laney Douglas. 3d data management: "Controlling data volume, velocity and variety." Technical Report 949, META Group Inc., 2001.

Horacio Gonzalez-Velez and Mario Leyton. "A survey of algorithmic skeleton frameworks: high-level structured parallel programming enablers." Softw., Pract. Exper., 40(12):1135-1160, 2010.

Dhrubajyoti Goswami, Ajit Singh, and Bruno R. Preiss. "Architectural skeletons: The re-usable building-blocks for parallel applications." In PDPTA, pp. 1250-1256, 1999.

Herbert Kuchen Philipp Ciechanowicz, Michael Poldner. "The muenster skeleton library muesli—a comprehensive overview." Working Paper ERCIS, (7):1-82, 2009.

Usman Dastgeer: "Skeleton Programming for Heterogeneous GPU-based Systems", Jan. 1, 2011 (Jan. 1, 2011), XP055148154, Linkopings University, ISBN: 978-9-17-393066-6, Retrieved from the Internet: URL:http://libris.kb.se/resource/bib/12308713 [retrieved on Oct. 30, 2014], 108 pgs.

Usman Dastgeer et al.: "Auto-Tuning SkePU: A Multi-Backend Skeleton Programming Framework for Multi-GPU Systems", Proceeding of the 4th International Workshop on Multicore Software Engineering, IWMSE '11, Jan. 1, 2011 (Jan. 1, 2011), XP055148152, New York, New York, USA DOI: 10.1145/1984693. 1984697, ISBN: 978-1-45-030577-8, pp. 25-32.

Franz Farber et al.: "The SAP HANA Database—An Architecture Overview", IEEE Data Engineering Bulletin, vol. 35, Mar. 1, 2012 (Mar. 1, 2012), pp. 1-6, XP055148167, pp. 1-6.

Extended European Search Report, from a corresponding foreign application, EP14002086.8, dated Nov. 13, 2014.

* cited by examiner

|  | Programming language | Distribution library | Skeleton set |
|---|---|---|---|
| Alt | Java | Java RMI | map, zip, apply, scan, sort, reduce, replicate |
| ASSIST | Custom control lang. | TCP/IP + ssh/scp | seq, parmod |
| Calcium | Java | ProActive | seq, pipe, farm, for, while, map, d&c, fork |
| Eden | Haskell (extension) | PVM / MPI | map, d&c, pipe, iterUntil, torus, ring |
| eSkel | C | MPI | pipe, farm, deal, Butterfly, hallowSwap |
| HDC | Haskell (subset) | MPI | map, red, scan, filter, dcA, dcB, dcD, dcE, dcF |
| HOC | Java | Globus | farm, pipe, wavefront |
| JaSkel | Java | RMI | farm, pipe, heartbeat |
| Lithium | Java | RMI | pipe, map, farm, reduce |
| Mallba | C++ | NetStream MPI | exact, heuristic, hybrid |
| Muesli | C++ | MPI OpenMP | array, matrix, farm, pipe, parallel comp. |
| Muskel | Java | RMI | farm, pipe, seq, custom |
| P3L | Custom control lang. | MPI | map, reduce, seq, comp, pipe, farm, scan, loop |
| QUAFF | C++ | MPI | seq, pipe, farm scan, pardo |
| SAC | Custom | Threads | genarray, modarray, fold |
| SCL | Custom control lang. | Ad hoc Tools | map, scan, farm, fold, SPMD, iterateUntil |
| Skandium | Java | Threads | seq, pipe, farm, for, while, map, d&c, fork |
| SKELib | C | MPI | farm, pipe |
| SkeTo | C++ | MPI | list, matrix, tree |
| SkIE | GUI /Custom control lang. | MPI | farm, pipe, map reduce, loop |
| Skil | C (subset) | --- | pardata, map, fold |
| SkiPPER | CAML | SynDex | scm, df, tf, intermem |

FIG. 2

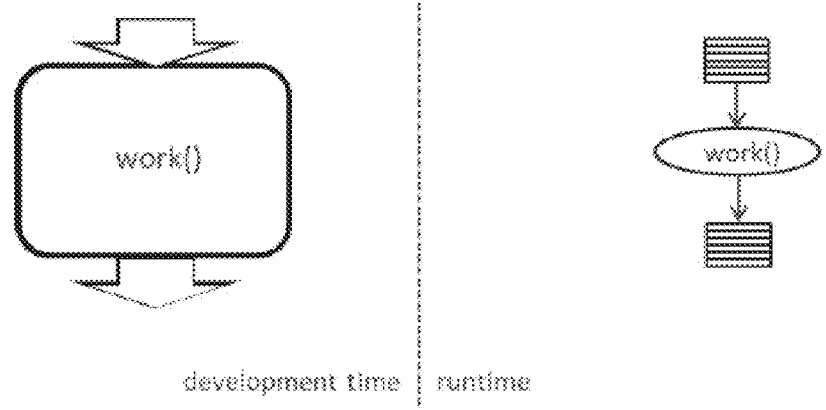
FIG. 3A
FIG. 3B
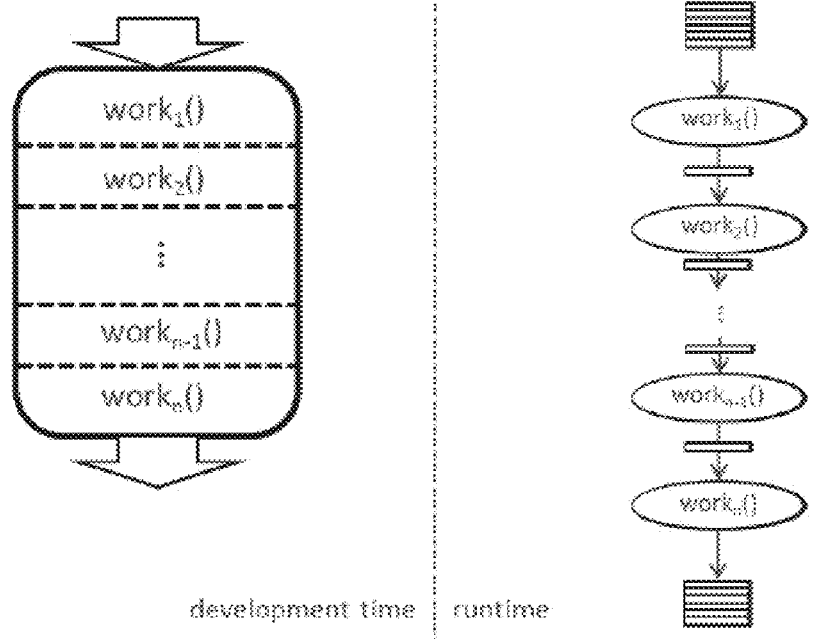

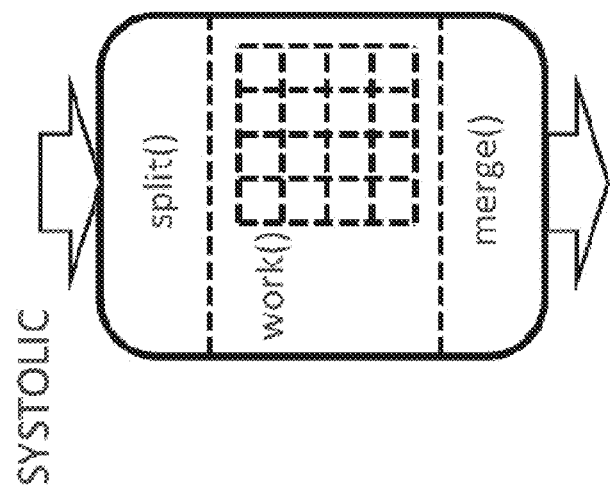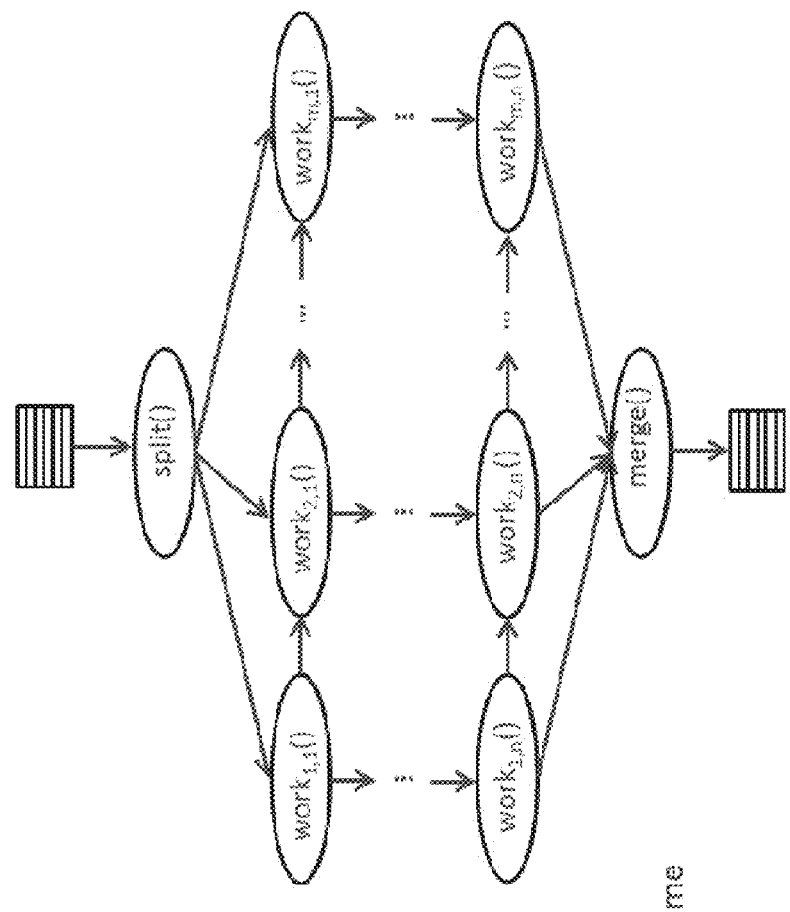
FIG. 3C

01. for all classes $c_i \in c_1, \ldots, c_m$
02.   for all documents $x_k \in x_1, \ldots, x_n$ of class $c_i$
03.     for all feature $l_j \in l_1, \ldots, l_v$ of document $x_k$
04.       $sum_k(l_j) = \sum count(l_j)$;
05.     od;
06.   od;
07.   for all feature $l_j \in l_1, \ldots, l_v$ in all $x$ of class $c_i$
08.     $sum_j = \sum_{k=1}^{n} sum_k(l_j)$;
09.     $\mu_j = sum_j / count(x|c_i)$;
10.     for $k \in 1, \ldots, n$
11.       $diff_k = sum_k(l_j)/\mu_j$
12.     od;
13.     $\sigma_j = \sum_{k=1}^{k} diff_k$
14.     $G_j = \mathcal{N}(\mu_j, \sigma_j)$
15.   od;
16.   $M_i = \bigcup_{j=1}^{v} G_j$
17. od;

FIG. 5A

01. for all documents $x_k \in x_1, ..., x_n$
02.    for all classes $c_i \in c_1, ..., c_m$
03.       Compute $P(c_i)$;
04.       for all feature $l_j \in l_1, ..., l_v$ of document $x_k$
05.          Compute $P(l_j|c_i)$;
06.       od;
07.       $P(x_k|c_i) = \prod_{j=1}^{v} P(l_j|c_i)$;
08.       $f_i(x_k) = P(c_i) * P(x_k|c_i)$;
09.    od;
10.    Assign $x_k$ to the class of $max(f_1(x_k), ..., f_m(x_k))$
11. od;

$\left.\begin{array}{l}\text{lines 01-09}\end{array}\right\}$ MAP $\left.\begin{array}{l}\text{line 10}\end{array}\right\}$ REDUCE

FIG. 5B

```
CREATE TABLE C(CID string, FID String, mu Double, sigma Double)
   PRIMARY KEY (CID, FID);
CREATE TABLE D1(DID Integer, PID Integer, text String)
   PRIMARY KEY (DID, PID);
CREATE TABLE D2(DID Integer, PID Integer, FID String, count Integer)
   PRIMARY KEY (DID, PID, FID);
CREATE TABLE D3(DID Integer, PID Integer, CID string, FID String,
                count Integer, mu Double, sigma Double)
   PRIMARY KEY (DID, PID ,CID, FID);
CREATE TABLE D4(DID Integer, PID Integer, CID string, probability Double)
   PRIMARY KEY (DID, PID, CID);
CREATE TABLE D5(DID Integer, CID string)
   PRIMARY KEY (DID);

CREATE PROCEDURE COUNT(IN data D1, OUT sumCounts D2)
LANGUAGE LLANG AS
BEGIN PARALLEL  CE_SPLIT(:data, ("DID", "PID"), "Hash", 32)
BEGIN
*L code to count FID in text *
END
END PARALLEL CE_AGGREGATION(:counts, [sum("count")], ["DID","PID","FID"]);

CREATE PROCEDURE PROB(IN countsJoinClass D3, OUT probabilities D4)
LANGUAGE LLANG AS
BEGIN PARALLEL  CE_SPLIT(:countsJoinClass, ("DID", "PID", "CID"), "Hash", 32)
BEGIN
*L code to calc probability *
END
END PARALLEL CE_UNION_ALL();

CREATE PROCEDURE SelectClass(IN probabilities D4, OUT docClass D5)
LANGUAGE LLANG AS
BEGIN PARALLEL  CE_SPLIT(:probabilities, ("DID"), "Hash", 32)
BEGIN
*L code to select max class*
END
END PARALLEL CE_UNION_ALL();

CREATE PROCEDURE documentClassification(IN data D1, IN classModel C, OUT
docClass D5)

LANGUAGE SQLSCRIPT AS
BEGIN
CALL Count(:data, sumCounts);
countsJoinClass = CE_JOIN(:sumCounts, : classModel);
CALL Prob(:countsJoinClass, probabilities);
CALL SelectClass(:probabilities, docClass);
END;
```

FIG. 5C

| source node | 2 least cost target nodes | cost |
|---|---|---|
| a | d & b | 5 |
| b | a & e | 6 |
| c | b & a | 8 |
| d | a & c | 7 |
| e | b & d | 9 |

Lower bound cost = ½ * (5+6+8+7+9) = 17.5

PARALLEL PROGRAMMING OF IN MEMORY DATABASE UTILIZING EXTENSIBLE SKELETONS

CROSS-REFERENCE TO RELATED APPLICATION

The instant nonprovisional application is a continuation of U.S. patent application Ser. No. 13/924,105, filed Jun. 21, 2013 and incorporated by reference in its entirety herein for all purposes.

BACKGROUND

Embodiments of the present invention relate to parallel programming, and in particular, to parallel programming of an in memory database with extensible skeletons.

Unless otherwise indicated herein, the approaches described in this section are not prior art to the claims in this application and are not admitted to be prior art by inclusion in this section.

Parallelism is a factor in implementing the operational requirements for processing large data sets. However, parallelism remains difficult to cope with from an application perspective, as it is hard to control and to debug.

The traditional landscape of parallel relational database systems offers an integrated and transparent exploitation of parallelism to execute SQL queries efficiently on different parallel system architectures. Systems provide support for parallelism on chip/board level via multi-threaded execution models, as well as physical operator implementations with the goal to bridge the gap between different nodes within a cluster scenario.

In memory databases may also follow that main path, but provide additional constructs to compile complex custom code into generic operators of an execution model. Since such systems do not have any knowledge about a potential degree of parallelism, either the system is forced to execute custom code snippets fully sequentially or the model developer has to describe the possible parallelization of the custom code. Therefore, the application programmer has to explicitly think and program in parallel data structures and has to explicitly define synchronization points. This behavior might result in situations where the degree of parallelism defined by the programmer does not match an optimal degree of parallelism during runtime. Additionally, since programming in a parallel way requires training and expertise, some of the models might simply not fully leverage possible parallelism and substantially miss performance opportunities.

Accordingly, the present disclosure addresses these and other issues with techniques for parallel programming of an in memory database utilizing extensible sets of algorithmic skeletons.

SUMMARY

An execution framework allows developers to write sequential computational logic, constrained for the runtime system to efficiently parallelize execution of custom business logic. The framework can be leveraged to overcome limitations in executing low level procedural code, by empowering the system runtime environment to parallelize this code. Embodiments employ algorithmic skeletons in the realm of optimizing/executing data flow graphs of database management systems. By providing an extensible set of algorithmic skeletons the developer of custom logic can select the skeleton appropriate for new custom logic, and then fill in the corresponding computation logic according to the structural template of the skeleton. The skeleton provides a set of constraints known to the execution environment, that can be leveraged by the optimizer and the execution environment to generate parallel optimized execution plans containing custom logic, without the developer having to explicitly describe parallelization of the logic.

An embodiment of a computer-implemented method comprises, in a design time environment providing compute logic for data management to a parallelization engine as a first input, providing a skeleton template to the parallelization engine as a second input, and causing the parallelization engine to transform the compute logic into an instantiation of the skeleton describing the compute logic. In a run time environment, the parallelization engine is caused to embed the instantiation into a parallel execution plan for execution in parallel.

An embodiment of a non-transitory computer readable storage medium embodies a computer program for performing a method. The method comprises, in a design time environment providing compute logic for data management to a parallelization engine as a first input, providing a skeleton template to the parallelization engine as a second input, and causing the parallelization engine to transform the compute logic into an instantiation of the skeleton describing the compute logic. In a run time environment, the parallelization engine is caused to embed the instantiation into a parallel execution plan for execution in parallel.

An embodiment of a computer system comprises one or more processors and a software program, executable on said computer system. In a design time environment, the software program is configured to provide compute logic for data management to a parallelization engine as a first input, provide a skeleton template to the parallelization engine as a second input, and cause the parallelization engine to transform the compute logic into an instantiation of the skeleton describing the compute logic. In a run time environment, the software program is configured to cause the parallelization engine to embed the instantiation into a parallel execution plan for execution in parallel.

In some embodiments the parallel execution plan further comprises an additional data operation.

According to certain embodiments, the additional data operation comprises a relational operator.

In various embodiments the parallel execution plan further comprises an additional skeleton instance.

According to particular embodiments the parallelization engine comprises a calculation engine of an in memory database.

In some embodiments the compute logic is transformed into the instantiation according to a calculation model comprising a data flow graph.

The following detailed description and accompanying drawings provide a better understanding of the nature and advantages of particular embodiments.

BRIEF DESCRIPTION OF THE DRAWINGS

FIG. 2 is a comparative table of algorithmic skeleton frameworks.

FIG. 3A shows the SEQUENTIAL architectural skeleton.

FIG. 3B shows the PIPE parallel architectural skeleton.

FIG. 3C shows the SYSTOLIC parallel architectural skeleton.

FIG. 5A shows pseudo code to train text classification.

FIG. 5B shows pseudo code to assign documents to language classes.

FIG. 5C shows script snippets to implement document language classification according to an embodiment.

DETAILED DESCRIPTION

Described herein are techniques for parallel programming of an in memory database utilizing extensible skeletons. The apparatuses, methods, and techniques described below may be implemented as a computer program (software) executing on one or more computers. The computer program may further be stored on a computer readable medium. The computer readable medium may include instructions for performing the processes described below.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

The trend on the hardware side to increase the number of processing units (either cores or nodes) is conceptually easy to exploit, if the system is working with a fixed set of operators. Parallelization can be done during the development time of the system and the runtime can decide about the degree of parallelism. The most famous examples are parallel implementations of different relational operators in RDBMS. For example, a database system may have a highly tuned and well tested parallel implementation of a join operator.

As soon as the semantics of "operators" is not yet known during development time, it is hard for the system to come up with an efficient parallel execution plan—this is left to the developer. As soon as application logic is moved into the system, e.g. as generic operators, the application developer has to provide a parallel implementation, which may be difficult.

Accordingly, embodiments relate to an "Open paRallel Computing Architecture" (ORCA) that provides a set of 2nd order functions, hereafter referred to as parallel algorithmic skeletons, which may address this issue. As soon as the application programmer adheres to the constraints coming with the skeletons, the system is able to automatically provide a parallel execution. Also, the application developer may remain in a serial execution model. In the following, different skeletons are presented, and it is shown that the MapReduce programming paradigm can be subsumed by a more general approach providing the application programmer a higher degree of freedom and picking the best combination of skeletons to express the parallel aspects of the application problem. Embodiments support application programmers to produce application code which is able to run in parallel and exploit current hardware architectures more effectively.

Figure 1:
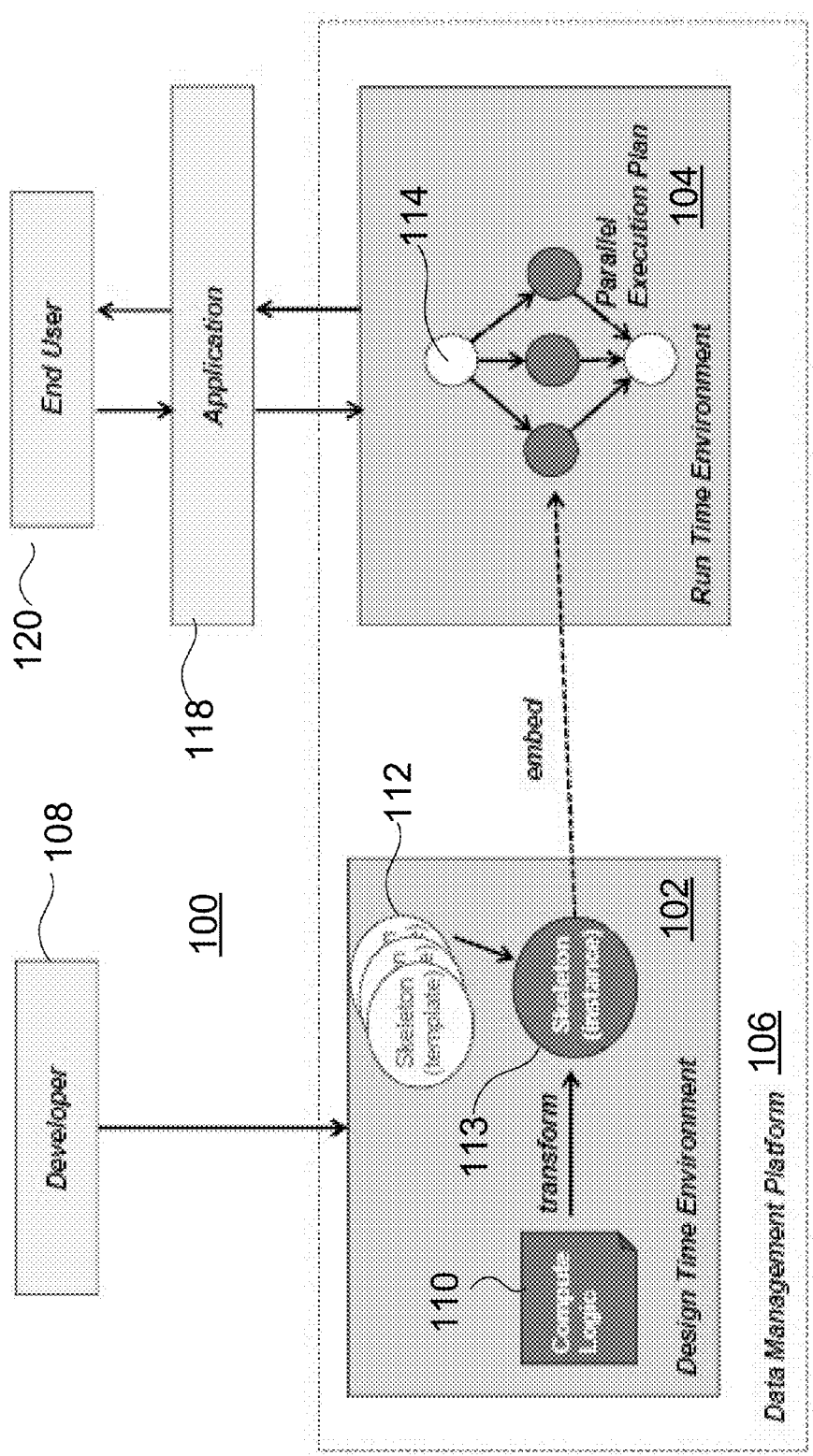
FIG. 1 shows a simplified view of an embodiment of a system.

FIG. 1 is a diagram showing a simplified high level view of a system 100 according to an embodiment. A Design Time Environment 102 and a Run Time Environment 104 are both part of a Data Management Platform 106 in which extensible skeletons are to be employed for parallel programming.

At design time a developer 108 takes problem-specific compute logic 110, and selects the appropriate skeleton. As used herein, the basic form of the skeleton is referred to herein as a skeleton template 112.

The developer then describes the compute logic in the form of the selected skeleton template. The skeleton is provided by the design time environment, and is known to the run time environment.

The compute logic as described in the form of the selected skeleton, is herein referenced as an instantiation 113 of the skeleton template. By transforming the compute logic into a particular instantiation of the specific skeleton, the compute logic follows certain structural and dependency constraints defined by the selected skeleton template.

The instantiation of the skeleton describing the compute logic, is then embedded in a Parallel Execution Plan 114. Since the run time environment is aware of the constraints imposed by the skeleton template that is being used, the run time environment can automatically devise the best way to parallelize the different parts of the provided compute logic as part of the parallel execution plan.

Such a parallel execution plan can also include other data operations or skeleton instances. Examples of such other data operations include but are not limited to relational operators, and those other data operators or skeleton instances are shown in open circles 112.

The optimized parallel execution plan is executed as the response of a corresponding function/service call from an application program 118 being used by one or multiple end users 120. The results of the executed parallel execution plan are returned to the application program, and then returned (perhaps in modified form) to the end user.

Figure 1A:
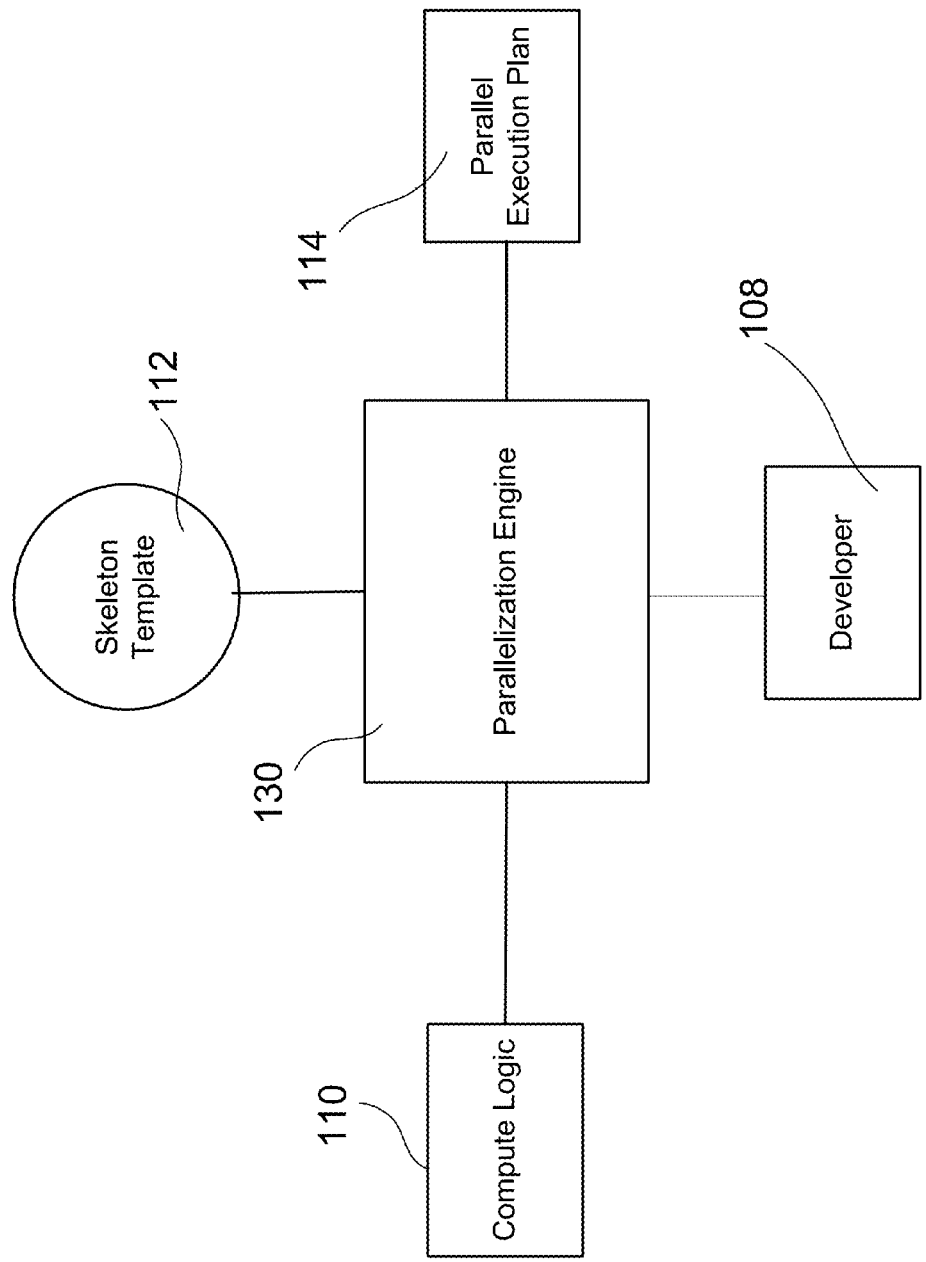
FIG. 1A shows a simplified view of a parallelization engine that is configured to implement the parallel programming according to embodiments.

FIG. 1A shows a simplified view of a parallelization engine that is configured to implement the parallel programming according to embodiments. In particular, parallelization engine 130 is configured to receive a first input in the form of compute logic 132 comprising a data flow. The parallelization engine is also configured to receive a second input in the form of a skeleton template 134.

In response to these inputs, the parallelization engine is configured to produce an output 136. Specifically, the parallelization engine is configured to transform the compute logic into an instantiated skeleton that is configured to execute that compute logic in a parallel manner according to the skeleton template. The developer selects one of a given set of skeletons (templates) and maps given custom logic to the structure and constraints of the skeleton in order to achieve a skeleton instance.

That instantiated skeleton in then embedded in the run time and executed, as is shown and discussed below in connection with FIG. 3. The parallel execution of such a skeleton instance (likely as part of a more complex execution plan) is determined and performed by the run-time system.

Figure 1B:
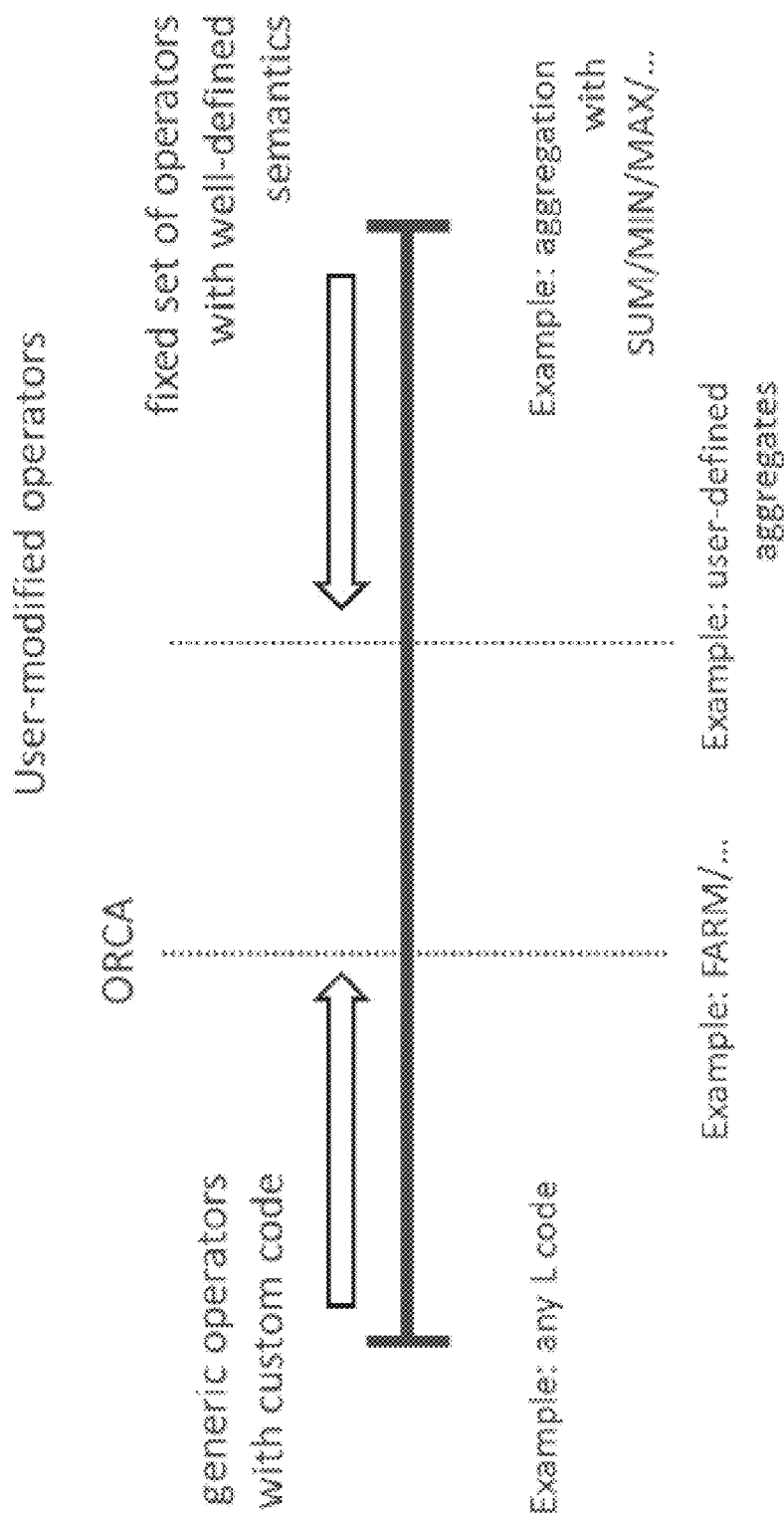
FIG. 1B shows a simplified view illustrating a spectrum of possible approaches to addressing the issue of parallel programming.

FIG. 1B shows a simplified view showing a location of the ORCA approach within a spectrum of possible approaches to addressing the issue of parallel programming. In particular, FIG. 1B shows ORCA to occupy a middle ground between the use of generic operators with custom code, and the use of a fixed set of operators with well-defined semantics.

Figure 1C:
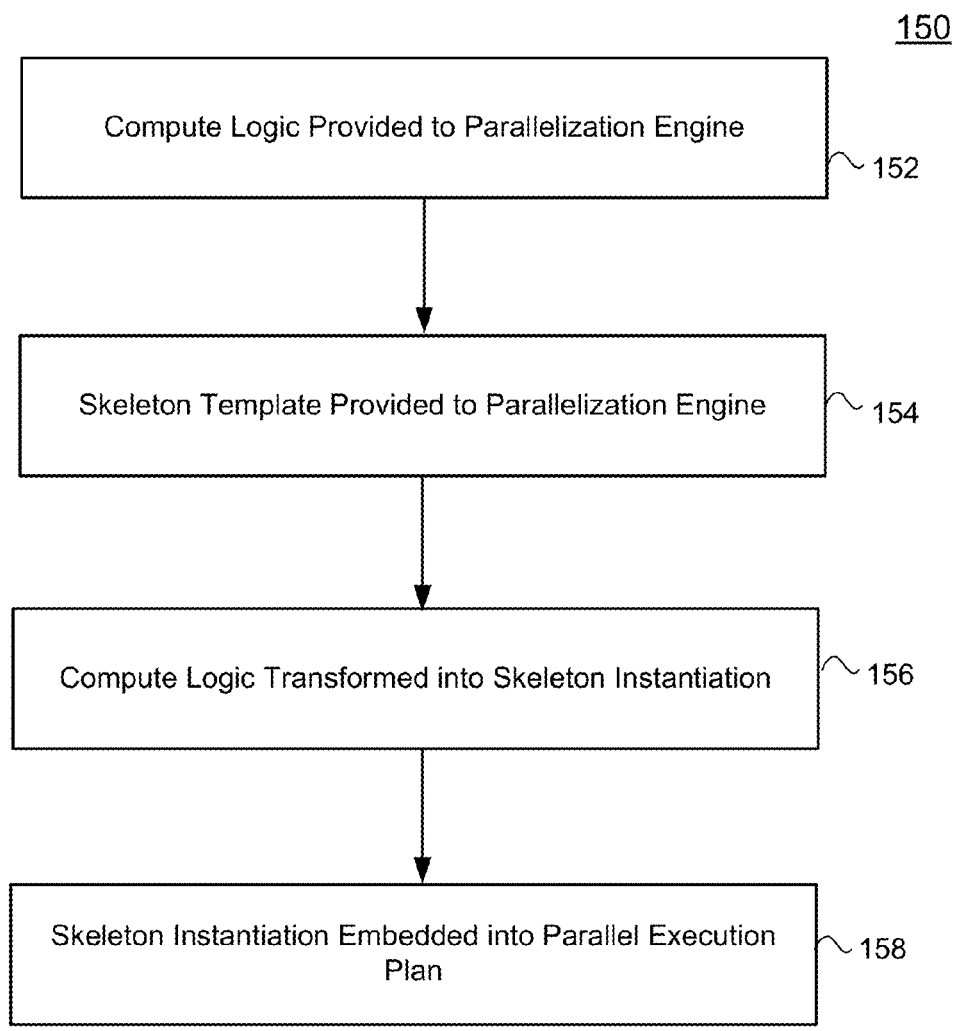
FIG. 1C is a simplified flow diagram showing an embodiment of a method.

FIG. 1C shows a simplified process flow of a method 150 according to an embodiment. In a first step 152, in a design time environment compute logic for data management is provided to a parallelization engine as a first input. In a second step 154, a skeleton template is provided to the parallelization engine as a second input. In a third step 156, the parallelization engine is caused to transform the compute logic into an instantiation of the skeleton describing the compute logic. In a fourth step 158, in a run time environment the parallelization engine is caused to embed the instantiation into a parallel execution plan for execution in parallel.

1.1 Parallelism from a Database Perspective

The "closed" set of relational operators with their very accurately defined semantics allow exploiting parallelism as much as possible while providing full transparency to the user. On the one hand, the user therefore is not aware of any parallelism used to execute a specific database query. On the other hand, the user may not have a way to convey any application-specific knowledge which might help the system to even further leverage a parallel run-time environment. The classical approach used in relational database systems— due to the nature of data processing—is data driven and usually reflected in terms of data-flow graphs with nodes representing certain relational operators and edges standing in for the data flow between the different operators. Based on this notion of a data flow graph, relational query engines typically support two different types of parallelism: data parallelism and pipeline parallelism.

1.1.1 Data Parallelism

Data parallelism allows to split data into multiple chunks (either horizontally or vertically) and to execute relational operators locally on those fragments. While unary operators like selection can be directly processed on the corresponding fragments, binary operators like joins require to copy data partitions between different system components if the partitioning criteria are not compatible. Specifically, the following distribution patterns can be distinguished.

In the case of co-located data, the partitions are already compatible, i.e. there is no need to re-distribute data. Co-located data partitions are therefore a desirable case. In multidimensional scenarios (like star or snow flake-schemas), the large fact table can be partitioned to be compatible with a partition criteria of one dimension table.

In the case of a one-sided distribution, the one-sided distribution picks one of both tables and re-distributes the data to be compatible with the partitioning scheme of the other table. It might be worthwhile to note that often the smaller of both tables will be repartitioned. The ultimate goal of the optimizer however is to produce a partitioning scheme which requires as few redistributions within the complete query as possible. For the sake of reducing the communication costs in total, the optimizer might therefore decide to re-distribute the larger table.

In the case of two-sided distribution, the two-sided distribution scheme reparations both incoming tables of a parallel operator to a new partitioning scheme. That new partitioning scheme usually allowing co-located operators within the course of the query processing.

In the case of broadcast, if one of the operand tables of a parallel operator is sufficiently small, the optimizer may decide to replicate the smaller table to all partitions of the second operand.

Data parallelism has two major advantages for query processing. First, data partitions can be processed in parallel to reduce the overall processing time. Secondly the optimizer may prune partitions which do not satisfy the selection predicate of a given query. Since both strategies are to some extent working in the opposite direction, i.e. try to exploit as much parallelism as possible versus reduce the number of partitions as much as possible, traditional physical schema design patterns employ a two-level schema of data parallelism: a first layer based on an application predicate (e.g. month or region) to easily prune the data set and a second layer based on hash distribution to support parallel processing.

1.1.2 Pipeline Parallelism

Orthogonal to data parallelism, pipeline parallelism tries to execute a sequence of operators at the same time working on different sets of data. Pipeline parallelism is commonly used in classical database systems and an optimizer has to decide whether to prefer pipelined plans over plans with blocking operators. On a SQL level, the application programmer may have an opportunity to tell the system about the preference of a pipelined plan by adding the "FETCH FIRST ROWS . . . " clause to the SELECT-statement. The overall challenge in defining a pipeline consists in clustering operators such that the average processing time of all operators is very similar. As illustrated in the Halloween-effect, pipeline parallelism may also exhibit side-effects. Within database systems, one may distinguish three classes of pipeline parallelism. Tuple-based pipelining (tuple-as-a-time) implies to have pipelines with individual tuples as the unit of work and fits nicely to the open-next-close paradigm. Introduced with the X100-system, coarse-grained pipelines comprises vectors of individual values as units of work and significantly reduces the overhead of switching contexts in different operators. The third class table-as-a-time basically implies tables as the unit of work. Operators are working completely the input stream and generate the full result in an output stream before the control will be handed over to the subsequent operator. The HANA™ in memory database available from SAP AG of Walldorf, Germany, is a representative of this last class.

While the following description focuses upon the HANA™ database, embodiments are not limited to this particular data management platform. Other examples of in memory databases include the SYBASE IQ database also available from SAP AG; the Microsoft Embedded SQL for C (ESQL/C) database available from Microsoft Corp. of Redmond, Wash.; and the Exalytics In-Memory database available from Oracle Corp. of Redwood Shores, Calif.

1.1.3 Extensibility within SAP HANA™

Within the SAP HANA™ database system, the "closed world" of a traditional relational setup is softened by an extensible operator model. In addition to traditional operators to implement the expressiveness of the relational data model, the SAP HANA™ calc engine offers the opportunity to insert generic operators executing custom code in R or L consuming and producing any number of tables. HANA™ calc models can be created during development time, are stored within the SAP HANA™ database repository during deployment time, and can be activated and instantiated with specific parameters during runtime. This technical capability of putting any arbitrary custom code into generic operators of a data-flow graph opens up a wide arena of opportunities but at the same time requires some guidance from a software development and database query optimization perspective. For example, the calc model designer has to decide which parts of the application problem should be expressed using the data-flow principle of the overall calc model and which should be pushed into control-flow centric code fragments.

1.2 Parallelism from a Programming Language Perspective

Exploiting parallelism from a programming language perspective has an even longer history than considering parallelism within the data management domain. Especially in the context of scientific applications, a variety of different parallel programming paradigms have been developed and successfully deployed. For example, Fortran compilers reflect an example of how to provide parallel language constructs to the programmer to carefully layout parallel programs. Recent development was focusing on introducing an abstraction of commonly used patters of parallel computation, communication, and data manipulation. Parallel algorithmic skeletons (PAS) provide a framework to enable programmers to write their code without considering parallelism explicitly as long as the developer is sticking to the constraints of the specific skeleton.

The MapReduce framework is a PAS in the data management world that tackles the large-scale processing of "Big Data" scenarios. However, MapReduce is only one example of a more generic set of skeletons which should be provided to the application developer and understood by the HANA™ optimizer to leverage the opportunity of parallelism.

Related work comprises multiple different PAS approaches tied to specific programming languages, based on some form of template mechanism, and reflect different programming paradigms (functional, object-oriented, imperative). FIG. 2 provides an overview of different solutions. The following main characteristics of the different solutions are now highlighted.

One solution is communications patterns. Many of the known solutions provide explicit communication patterns to send fragments of a larger (distributed) data structure to other instances of the same program. For example, a distributed data structure can be permuted according to the given function, which must be bijective and return the ID of the new process responsible for the partition.

Data structures are another solution. Due to the application domain of scientific computing, most of the existing solutions are based on some form of matrix as the core data structure. For example, the Muenster Skeleton Library (which is included in the Table of FIG. 2) is based on the two different data structures DistributedArray and DistributedMatrix with visible partition borders and an unique index into the elements of the data structure.

Scalar and aggregate functions are another solution. Many parallel architectural skeletons provide data-manipulation centric operators like MAP, ZIP, SCAN, and FOLD. Since the semantics of these skeletons can be easily mapped to classical relational operators, we do not have to consider them specifically. A more detailed discussion of such a mapping is given in below in section 3.1.

2. Algorithmic Skeletons for Data Flow Graphs

As outlined, existing parallel algorithmic skeletons are mainly based on programming languages and transient data structures, i.e. they do not follow the data-flow graph principle but work on the assumption of variables and assignments of values to variables.

Parallel algorithmic skeletons can be understood as high-level structural templates that help the developer to parallelize the execution of custom programs by allowing the developer to write sequential program logic in a constrained way so that its execution can be automatically parallelized by the underlying run-time system.

Skeletons may simplify programming by raising the level of abstraction. Skeletons may enhance portability and re-use by absolving the developer of the responsibility for detailed and typically system-specific realization of the underlying patterns. If available as high-level programming constructs directly supported by the underlying system, skeletons may improve performance by providing access to carefully optimized, architecture-specific implementations of common patterns. Skeletons may provide a scope for static (i.e. at design or deployment time) and dynamic (i.e. at run time) optimizations by imposing constraints and by explicitly capturing information about algorithmic structure (e.g. sharing and dependencies, or proposed degree of problem splitting) which otherwise would be very difficult to automatically extract from the given program logic.

In order to make parallel architectural skeletons usable for data management tasks and for the specific scenario of the SAP HANA™ calculation engine, a small set of skeletons with well-defined semantics are selected. As application use cases demand more specific patterns, the set may be extended, i.e. minimalism, full coverage, or absence of overlaps may or may not be present.

2.1 Principles of ORCA Algorithmic Skeletons

As mentioned above, a parallel algorithmic skeleton comprises a collection of attributes, which describes the behavior of a parallel execution pattern in an application-independent way. The use of algorithmic skeletons follows the model shown on the left-hand side of FIG. 3, which compares the traditional PAS approach with an intended application within SAP HANA™.

From an abstract perspective, the PAS approach distinguishes four different phases. A developer extends a given algorithmic skeleton by providing values for the various application-specific parameters associated with the attributes of the skeleton and by filling in application-specific execution logic. The developer's extension of a skeleton results in one or more parallel computing modules. Such a parallel computing module represents a constrained execution environment specific for the provided execution logic. Parallel computing modules can then be instantiated by providing application-specific parameters that control the execution of the application-specific execution logic. A parallel application in the sense of this model is then a systematic collection of instantiations of these modules that are interconnected and orchestrated by surrounding application logic.

Figure 3:
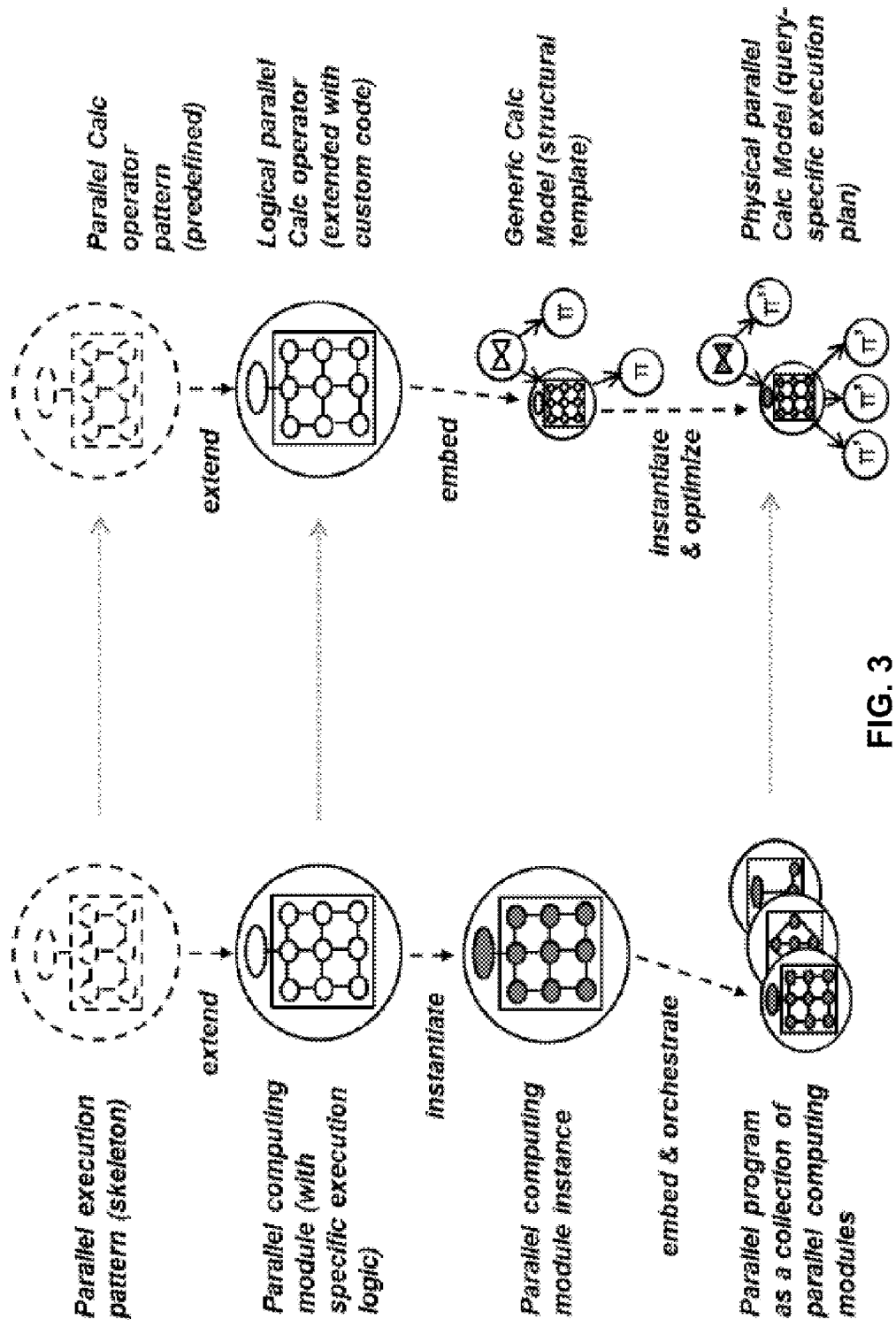
FIG. 3 shows adaptation of parallel algorithm skeletons to data flow graphs.

The application of this simple model to parallelization of custom logic results in the steps shown on the right-hand side of FIG. 3.

In a particular example, the SAP HANA™ database offers several approaches for the execution of data-intensive calculations in the database engine. There are at least two reasons why this achieves good performance. First, moving calculations in the form of Calculation Models to the database layer eliminates the need to transfer large amounts of data from the database to the application layer. Second, calculations should be executed in the database layer to get the maximum benefit from features offered by the HANA™ database such as fast column operations, query optimization, and parallel execution. If applications fetch data as sets of rows for processing on application level they cannot benefit from these features.

Calculation Models in HANA™ are data flow graphs, comprising multiple calculation operators. They should be understood as structural blueprints, rather than execution plans. In other words, a Calculation model describes the structure of a calculation and not an actual query. For example, at definition time, the calculation model may contain an aggregation node without grouping criteria; the attribute for grouping can then be supplied with the actual query. Depending on the information which is queried, the Calculation Engine tries to simplify and optimize these models and creates an instance of the model which can be executed subsequently.

One option for the execution of custom logic directly in the database is the use of application-specific custom operators in the Calculation Engine. These operators are written in C++ and provide a procedural implementation of data-intensive calculations or algorithms.

As shown in FIG. 3 on the right-hand side, the definition of different parallel Calculation Engine operator patterns is envisioned as general templates for the implementation of custom Calculation operators. The operator patterns hereby correspond to the Calc Skeletons described in the following sections.

Depending on the nature of the operator or algorithm to be implemented by the developer, he or she can choose the appropriate parallelization pattern. The constraints imposed by the selected operator pattern provide the Calculation Engine with additional information needed for the optimization and parallelization of the new operator.

The custom operator is then implemented by extending the selected parallelization pattern with specific custom code. The extended operator pattern provides a new (logical) Calculation Operator that can be part of a HANA™ Calculation Model comprised also of other, e.g. relational operators. In FIG. 3 the extended calculation pattern corresponds to what is called Virtual Machine completed with custom logic.

The new Calculation Engine operator can now be combined with other calculation operators in a generic Calculation Model. Depending on the specific query this generic Calculation Model and custom operator can now be parameterized and optimized by the Calculation Engine whereby the additional knowledge of the internal structure of the custom operator can be leveraged. These parameters can include for example specific values in filter conditions, or table and column names.

The resulting concrete Calculation Model then represents a query-specific execution plan which corresponds to what is called a Parallel Program. The optimized model, including the custom operator, is then executed by the execution layer in the database engine.

Besides the use for custom operators in Calculation Models, predefined operator patterns can also be leveraged to improve development efficiency and reuse in the development of new intrinsic operators in the HANA™ Calculation Engine.

As mentioned, as long as the application code is following the constraints imposed by the individual skeletons, the system may deploy parallelization schemes suitable for the specific application logic. The individual methods may infer some information about their current execution environment by calling the following methods with respect to the working data set D:

one method returns the number of elements (rows) within the local partition of the global data set R.

another method returns the total number of elements (rows) in the current data set.

still another method returns the unique number of the current thread.

In the following subsections a set of calc Skeletons are defined which may improve the design and parallelization opportunities of calc models having custom code embedded.

2.2 SEQUENTIAL Skeleton

The most basic skeleton SEQUENTIAL ensures that the application logic specified in the skeleton's work( )-method is executed in a strictly sequential manner, e.g. the system is not allowed to apply any form of parallelism. As a consequence, the skeleton comprises one single work( )-method representing the specified computation logic during development time. At runtime, the skeleton results in exactly one single generic operator to execute the logic in a strictly sequential way. This is similar to the execution of a L node in the HANA™ calculation engine today. FIG. 3A shows the corresponding symbolic pattern.

Code running within an SEQUENTIAL skeleton will always see the complete data set.

2.3 PIPE Skeleton

In comparison to the general parallelism concepts of data management systems, the set of Calc Skeletons is also subdivided into skeletons implementing data parallelism and pipeline parallelism. The PIPE skeleton is used to implement pipelined execution of multiple generic code blocks being executed in a sequence. As can be seen in FIG. 3B, different work( )-methods are passed as parameters to the skeleton and communication is performed in a pipeline manner to have multiple of the work( )-methods running concurrently and operating on output fragments of the preceding method. The different work( ) methods typically represent different operations on the underlying data.

By using the PIPE skeleton, the developer ensures that (a) the individual methods are able to consume input and generate output in a step-wise manner, and (b) the processing times of all participating operators are very similar, because the longest running operator determines the length of the operating cycle of the pipeline.

2.4 SYSTOLIC Skeleton

FIG. 3C illustrates an extension of the PIPE skeleton. A core idea of the SYSTOLIC skeleton is that individual data items may enter the pipeline and—depending on the value of the data entity or depending on the current state of the method (see section 3.2.3)—possibly travel through the grid of methods along different paths. A special variant of the SYSTOLIC skeleton sends every data item through all cells of the grid.

The behavior of the SYSTOLIC skeleton is determined by the mode of the SPLIT( )-operator DOWNSTREAM: if the split( )-operator has the DOWNSTREAM property attached to it, all intermediate results are propagated to the next work( )-operator in the local pipeline. If the DOWNSTREAM property is not given, the processing step itself my decide at runtime whether to forward a particular data item to the following operator or send it to work( )-methods of the same level.

SINGLESIDE: the SINGLESIDE mode allows the skeleton to forward intermediate results between the different processing steps with increasing position of the work( ) function, i.e. the intermediate result of $work_{i,j}( )$ may be forwarded to $work_{1,j+1}( )$ but not $work_{i,j-1}( )$ on every level.

NEIGHBORS: with this mode, intermediate results are distributed to the "left" and "right" neighbor of a particular work( )-method, i.e. the intermediate result of $work_{i,j}( )$ will be forwarded to $work_{i,j+1}( )$ and $work_{i,j-1}( )$.

BROADCAST: the intermediate results are sent to all work( )-methods within the same generation, including to the emitting processing step. If no specific semantics are given, the processing steps may decide to route every particular data item a potentially different way within the grid. This strategy reduces the potential of an optimizer to apply specific implementation variants. Moreover, the higher the degree of freedom is, the more the provided custom logic has to take care of deadlocks, loops etc.

2.5 WORKER FARM Skeleton

Figure 3D:
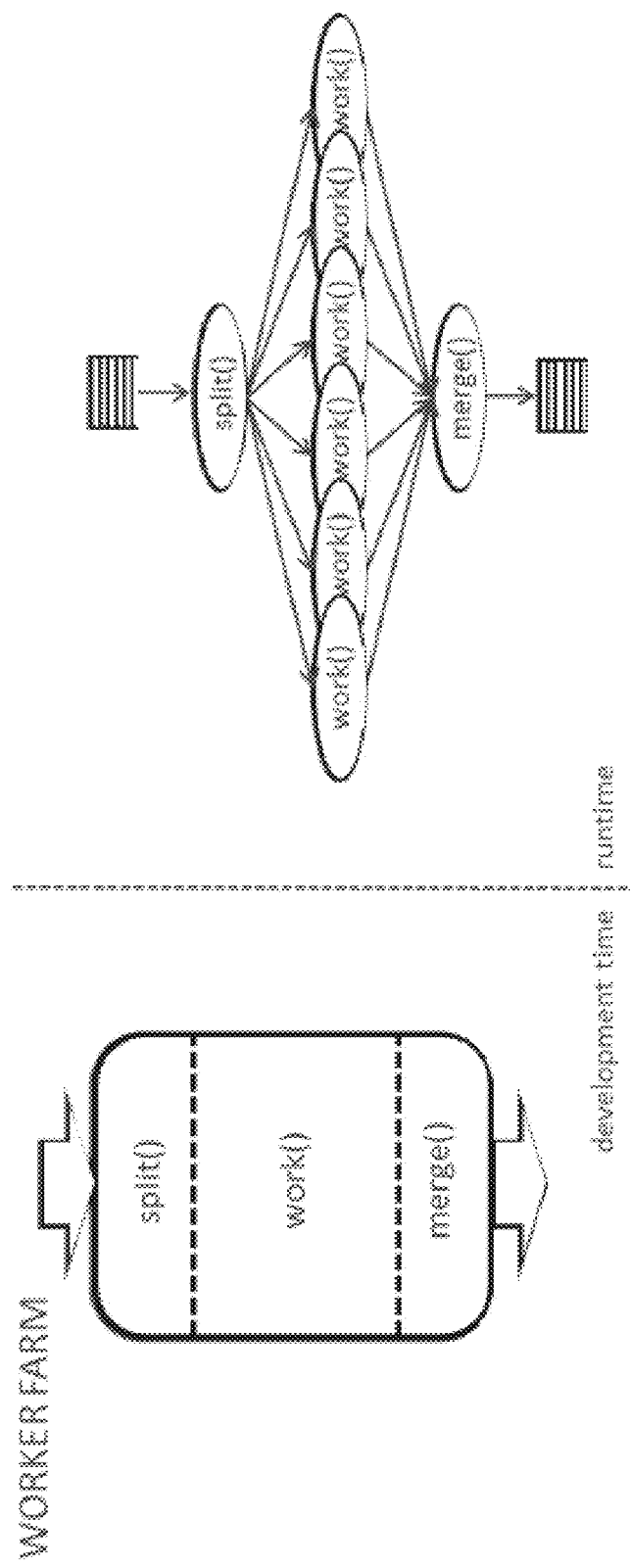
FIG. 3D shows the FARM parallel architectural skeleton.

Orthogonal to the PIPE skeleton, the WORKER FARM skeleton is a way to achieve data parallelism for given application logic. FIG. 3D shows the WORKER FARM parallel architecture skeleton. The WORKER FARM skeleton starts any arbitrary number of instances running in parallel and (usually) working on a separate chunk of the underlying data. Accordingly, the WORKER FARM skeleton comprises three methods as parameters. The repeated work( )-method reflects the application logic to be executed in parallel. The split( )-method is responsible for distributing the incoming data set to the individual runtime environments of the work( )-methods. In contrast to classical FARM skeletons, a Calc FARM skeleton deploys the following different split semantics:

HASH(<list of cols>): using a HASH signature allows the system to partition the data set into any arbitrary number of partitions based on hash values computed based on the values of given columns.

PARTITION(<list of cols>): the PARTITION mode tells the system that the smallest unit of data to be deployed with one instance of the work( )-methods comprises all tuples of the underlying data set with the same values in the given list of columns. For example, in a sales monitoring scenario PARITION (sales region, prod group, week) defines the smallest possible partition comprising all sales transactions within the same region, within the same week given for a specific product group.

CUSTOM(<any code>): the CUSTOM mode allows to define problem-specific split-semantics.

NONE( ): the data set will not be partitioned, e.g. every instance of the work( )-method will see the entire data set.

When deploying the FARM skeleton, the split( )-method is crucial for an efficient execution. If the designer is using the HASH( ) or PARTITION( ) option, the optimizer may figure out that this partitioning criterion is compatible with a criterion used in the neighboring operators. In such a situation, the optimizer may either perform the split earlier within the query execution plan or may refine the partitioning scheme without collapsing the data set into one single stream and reparations to feed data to the work( )-methods. Using the CUSTOM( ) option, the optimizer is forced to completely re-distribute the data, because the system is not able to figure out the semantics of the split criterion defined in the custom code. However, this option provides the developer the opportunity to implement any "partitioning" scheme which might be best suited for the following processing steps. For example, algorithms may require some information of neighboring partitions and the split( )-methods may produce "overlapping partitions".

In analogy to the split( )-method, the merge( )-method may also provide different refinement modes.

UNION( ): the UNION mode concatenates the output sets of the individual runs of the work( )-methods without any further checks with respect to existing duplicates etc.

REDUCE(<list of cols>, [SUM|COUNT|MIN|MAX|<any code>]): the REDUCE-mode implements the notion of an aggregation. Based on the given set of columns, either predefined aggregation functions or user-defined aggregation functions are executed and the result is attached to one single representative instance of the columns. Although the same effect can be achieved by adding a GROUP-BY operator after the WORKER FARM skeleton and letting the optimizer figure out the compatibility of the parallel data streams, having a more powerful REDUCE mode at the end of a WORKER FARM skeleton is a much more natural way of expressing these computational patterns.

CUSTOM(<any code>): analogous to a custom split( )-method, the custom merge( )-method may exhibit any arbitrary merge logic specific to the application program. Since the system will always reduce the parallel data streams to one single data set, custom merge( )-methods are supposed to be used with care and only when required by the specific application program.

In contrast to the data-parallelization patterns discussed in the remainder of this section, the degree of parallelism with the FARM-skeleton is defined by the system. The application developer just allow the maximum parallelism implicitly via the split( )-method.

The application of the WORKER FARM-skeleton is manifold, due to the inherent nature of data-parallelism in data-intensive applications. For example, the classical FOR-semantics of a loop can be—if there is no data-dependency within the individual runs—mapped to a WORKER FARM-skeleton with parallel execution of the loop body. The degree of parallelism is then constrained by the number of steps specified in the FOR construct.

2.6 DIVIDE and CONQUER Skeleton

The DIVIDE and CONQUER (DaC) skeleton reflects an algorithmic pattern where the degree of parallelism is defined by the problem itself and controlled by provided custom logic. Within the DaC-skeleton, the solution to a problem is generally obtained by dividing the original problem into smaller equal subproblems and recursively solving these subproblems. Solutions for the subproblems must be subsequently combined to form the final solution of the original problem. If the number of subproblems at each divide step is static and pre-determined, the DaC-skeleton turns into a so-called "fixed degree" DaC-pattern, which helps the system to plan and schedule the necessary system resources. Examples following the fixed degree DaC-skeleton include Discrete Fourier transforms, approximate integration, Quicksort, and matrix multiplication.

Figure 3E:
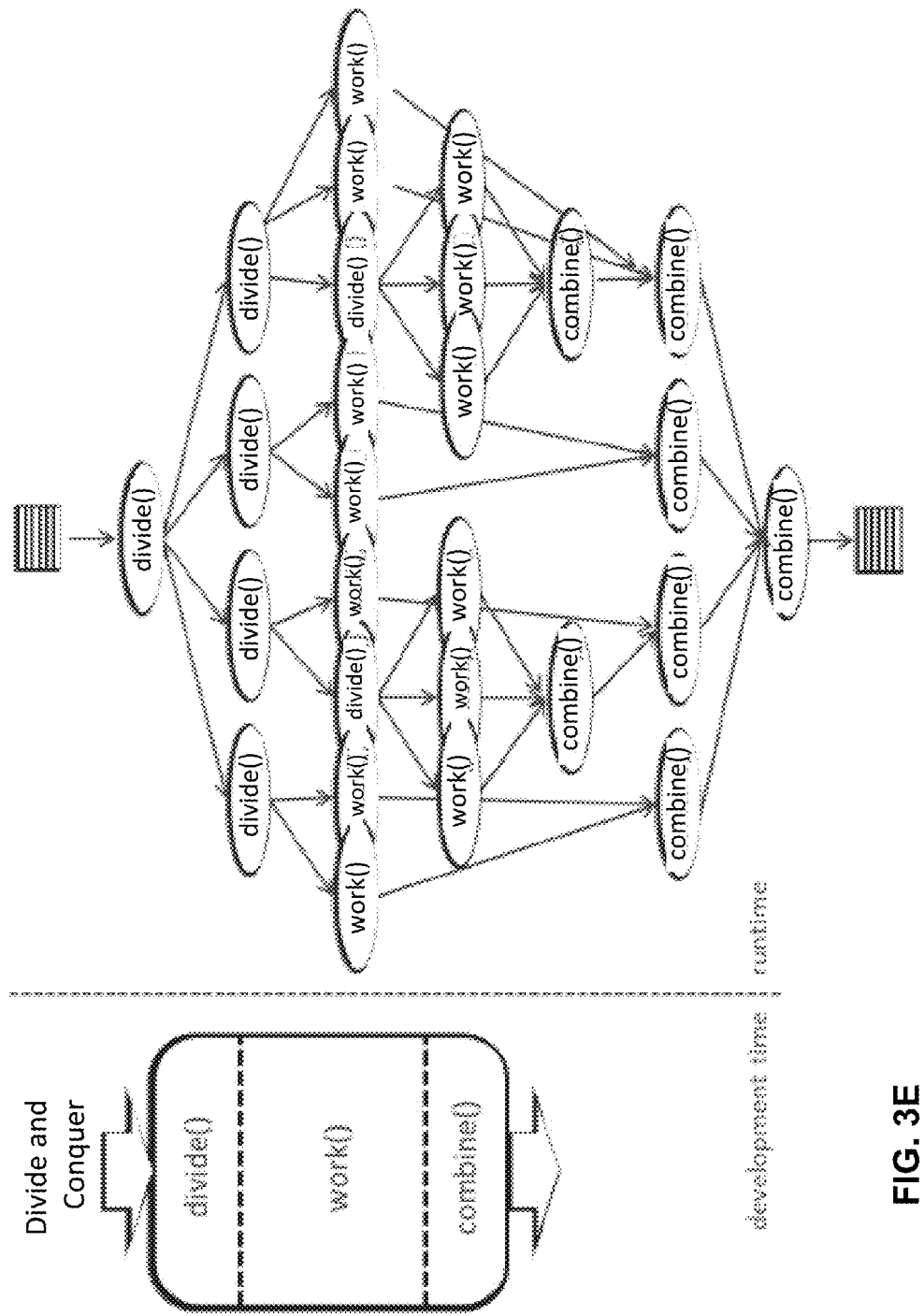
FIG. 3E shows the Divide and Conquer parallel algorithmic skeleton.

As illustrated in FIG. 3E, this DaC-skeleton is based on three different methods. The work( )-method constitutes the general solve step of the problem. The divide( )- and combine( )-methods are counterparts with respect to the FARM-skeleton. More precisely, the divide( )-methods may be implemented either using CUSTOM( )-mode to describe the problem-specific partitioning pattern or NONE( ) to fully replicate the incoming data set. The reduce( )-method similarly provides either a CUSTOM( ) mode to combine the partial results or UNION( ) if simple concatenation of the partial results is required.

2.7 BRANCH and BOUND Skeleton

The core idea of BRANCH and BOUND (BaB) is to provide a mechanism to systematically enumerate all potential solutions of a given problem and prune large portions of the search space by testing upper and lower estimated bounds of the optimized entity. Because of this characteristic, BaB-style algorithms are often used to provide "good enough" solutions by stopping to explore the search space if the bounds are below a given threshold of accuracy. Examples, which can be mapped to BaB-skeletons, are the Knapsack problem, the Traveling Salesman problem, the maximum satisfiability problem, and nearest neighbor search.

Figure 3F:
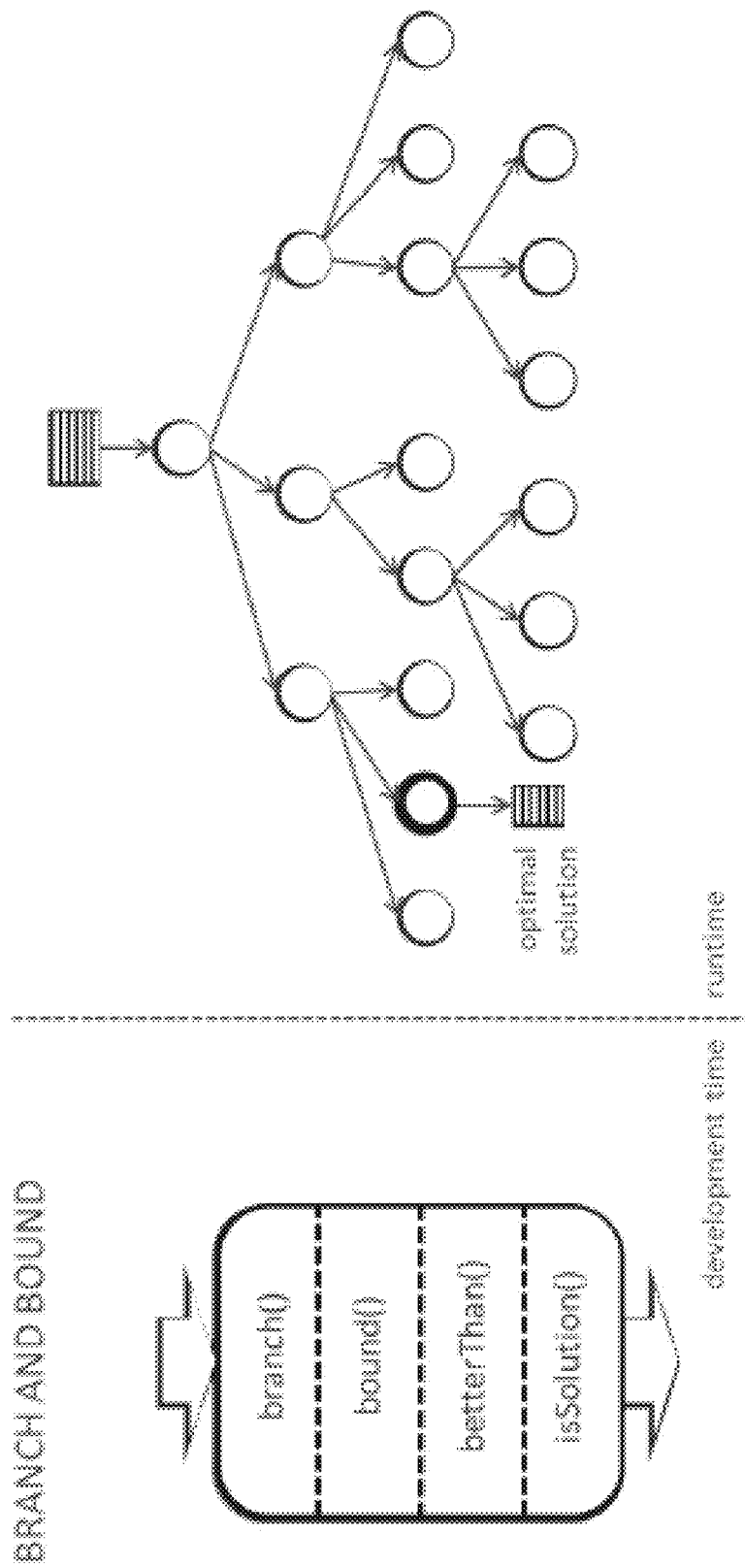
FIG. 3F shows the Branch and Bound parallel algorithmic skeleton

As outlined in the symbolic representation shown in FIG. 3F, the branch( )-method implements the branching rule defining the subproblems with usually pairwise disjoint state spaces. For a given subproblem, a bounding rule (reflected in the application code of the bound( )-method) estimates the best solution by computing a lower (upper) bound for the best solution to a given minimization (maximization) problem. Picking the sub-problem, which should be further explored is decided in a selection rule. The selection rule is implemented by the betterThan( )-method comparing to given problems. The method returns true, if the lower (upper) bound for the best solution to one problem is better than the lower (upper) bound for the best solution to the second problem.

Finally, the elimination rule decides which subproblems provide non-optimal or not promising solutions and should be discarded from the set of potential subproblems. In certain embodiments, this piece of custom logic has to be provided by the fourth method of the BaB-skeleton isSolution( ). In comparison to other data parallel-centric skeletons, the BaB-skeleton does not provide any explicit way to merge partial results because the algorithm targets to be read-centric by identifying "an index" into the overall data set pointing to the optimal or good-enough solution.

2.8 MAP and REDUCE Skeleton

The MAP and REDUCE skeleton is intended to capture the semantics of the well-known MapReduce programming model. The skeleton comprises two phases with an automatic re-partitioning of the data between the two different steps. Although this skeleton could be represented as a sequence of two WORKER FARM skeletons, the practical relevance justifies a dedicated skeleton. Additionally, having a special skeleton to directly represent the MapReduce programming paradigm eases the migration of existing Map and Reduce applications to the SAP HANA platform implementing embodiments as an extended set of parallel programming skeletons. Finally, having a special skeleton for MapReduce takes off the burden for the optimizer to automatically deduce the semantics of the repartitioning-step (shuffle) between the Map and the Reduce phase.

Figure 3G:
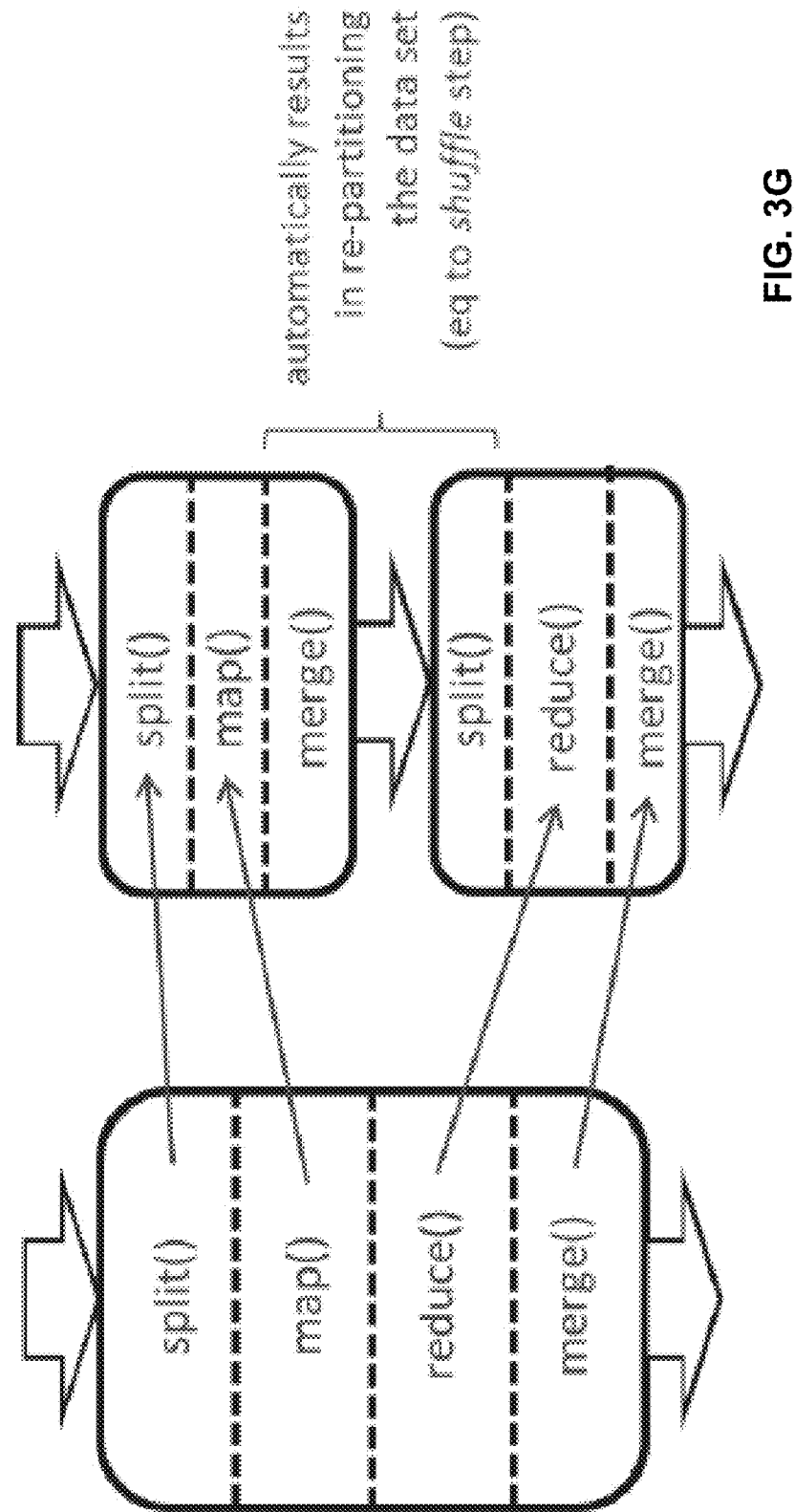
FIG. 3G shows the Mapping of the Map and Reduce to the Farm skeleton
Figure 3H:
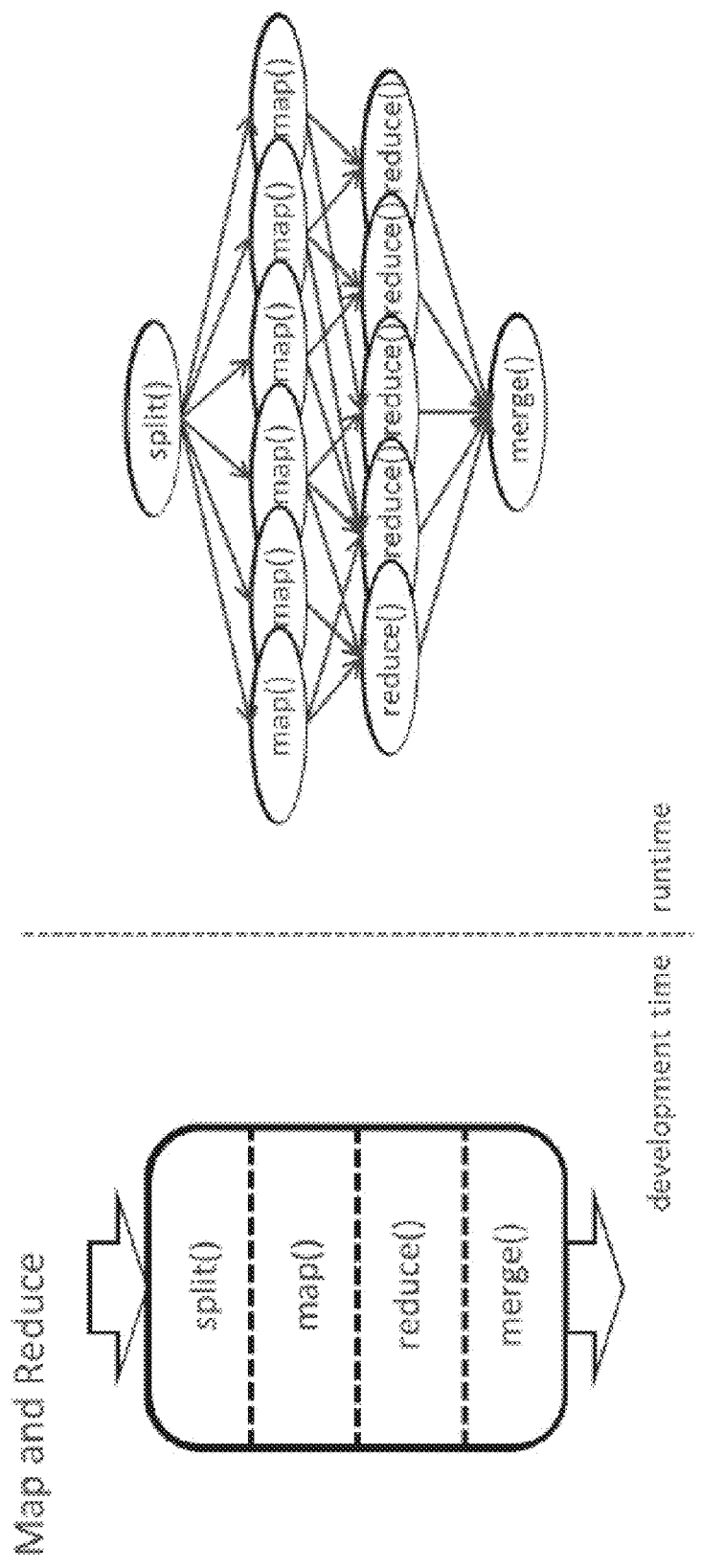
FIG. 3H shows the Map and Reduce parallel algorithmic skeleton

FIG. 3H illustrates the MapReduce skeleton. The merge( ) step is identical to a first set of workers realizing UNION semantics. The optimizer might take this as a hint that data is logically put into one place but may physically stay at the same place, i.e. FIG. 3G shows the Mapping of the Map and Reduce to the Farm skeleton at the local node.

The second set of workers maintains PARTITION(<list of cols>) semantics where <list of cols> represents the combined key of the intermediate result produced by the first set of workers.

2.9 Summary

The set of skeletons presented in this chapter comprises a small set of well-understood parallelization patterns. Additional skeletons can be added as the need arises.

Using these patterns in formulating data-intensive custom operations allows the data management system to apply specific optimizations when deploying custom logic based on skeletons. Since the patterns impose specific constraints that are known to the data management platform, the runtime system can optimize the degree of parallelization, e.g. based on available system resources, when executing provided custom logic.

3.0 Enhancements

Embodiments provide a defined set of parallelization skeletons known by the developer and the HANA™ optimizer. Having a small set of skeletons in a first step, may provide advantages. On the one hand, the set of skeletons can be increased as the users get used to it and provide application challenges which cannot be adequately supported by any of the current skeletons. On the other hand, the optimizer may incrementally improve and support more and potentially more complex skeletons. In order to show a complete picture of the PAS discussion, outlined here are skeletons which could be supported or be expressed by other relational operators. Also outlined are enhancements according to certain embodiments.

3.1 not Included PAS Primitives

As already mentioned, the PAS idea was originally developed in the parallel programming language community with an emphasis on high-performance number crunching environments solving complex numerical problems. From that perspective, some of the skeletons known in that context are not directly applicable to data-intensive scenarios. As shown below, the following PAS primitives are either not useful or can be easily expressed by relational operators with well-defined semantics and known parallelism capabilities.

The MAP primitive replaces each element of a global data structure by the result of applying a function f( ) to it. In relational terms, this can be achieved by embedding the function f( ) into a scalar expression, i.e. update foo set X=f(X).

The ZIP primitive creates a new data structure with the same size as the original structure where each element is initialized by the result of combining two data structures a and b by applying a function f( ) to elements of both data structures. In terms of the relational model, this primitive resembles a join between the two participating data structures and the application of a scalar function f( ) on columns of the output of the join.

The SCAN skeleton replaces each element at the i-th position within the data set by the result of folding E0 . . . Ei using a given function f( ). For example, the SCAN-skeleton can be used to implement a cumulative sum along a time dimension for different products.

The FOLD skeleton replaces a partition of a data set by one single representative by applying the function f( ). It may therefore be understood as a SCAN-skeleton returning only the "last" element. In terms of the relational representation, the FOLD skeleton can be represented by the GROUP-BY operator with its well-defined semantics if the function f( ) can be restricted to the traditional aggregation functions. If the GROUP-BY operator can be extended to general aggregation functions, it can act a as a full substitute.

Iterative Combination: a problem to be solved by Iterative Combination is described by a set of homogeneous objects (with details of any relevant internal structure) and of any relationship between them. Given a rule for combining two objects, and a measure of the value of the combination, the skeleton iterates through a loop in which each object is combined (possibly in parallel) with the most suitable remaining other object, if such exists, until either all objects have been combined into one, or no further acceptable combinations exist. This method is used when it is appropriate to solve problems by progressively imposing structure onto an initially uncoordinated collection of objects. Suitable problems include minimum spanning tree and connected components.

The Iterative Clustering pattern is designed for a possible implementation on rectangular grids of processors. Suitable problems have data-sets of instances which can be described as a collection of homogeneous objects whose individual descriptions may include information which relates them to each other. These problems are solved by recursively clustering (possibly in parallel) the objects into independent sub-clusters corresponding to every maximal subset of objects which are connected directly or transitively by a specific notion of "closeness". This continues as often as possible (or suitable), with members of clusters being considered together with all other members of their parent cluster and operated upon in some way with respect to each of these. The clustering process imposes a hierarchy of clusters onto the set of objects, with the original complete set at the root, and the measure of "closeness" can be parameterized by the level in the hierarchy. When recombining clusters, all pairs of objects will similarly be considered and manipulated appropriately.

3.2 Further Extensions

While the current set of skeletons might be useful to express the semantics of a large body of different analytical applications, extensions beyond the classical set of skeletons might be useful in a mid-term future. In particular, the following methods are identified going beyond the idea of extending the data flow graph.

3.2.1 Update-in-Place Query Execution Semantics

The traditional query processing follows a data flow principle with persistent data entities reflecting the leaf nodes, inner nodes reflecting operators of the current query, and edges reflecting the data flowing from the leaf nodes to the final root node representing the final result. In particular, a node is accepting one or potentially multiple incoming data streams and is producing an output stream potentially being consumed by multiple following operators. While it is advantageous to only perform read accesses on the incoming data, the system has to generate new data sets to reflect the output data stream.

In contrast, classical programming paradigm allows (and encourages) to reuse variables by assigning different values of an instance to the same variable. Inspired by this behavior, many skeleton frameworks provide the notion of update-in-place of global data sets as well.

Due to the nature of data-flow oriented data processing, update-in-place semantics are not supported in traditional query processing environments. However, within main-memory-centric system architectures, updating/overriding existing data structures might be an option to reduce the overhead in allocating memory for output data and copying from input to output data structures.

3.2.2 Specialized Data Structures

Within the classical (numerical problem solving) domain of PAS, multidimensional arrays or very large matrices are building the core data structures. Within the classical relational database context, sets of multi-attribute entities (tables) represent the core data structure. One way to efficiently map numerical problems to the database layer would be to also introduce specific data structures to be processed within the same data-flow and query execution framework. For example, it would be interesting to explore the opportunity to natively support (in addition to the iTab data structure) also iMatrix or even iGraph structures which might be more adequate to execute domain-specific custom code. From an abstract software engineering perspective, all those structures might be realized as a specialization of an iArray structure.

3.2.3 Stateful Operators and Messaging

Some of the traditional PAS rely on the notion of a "virtual machine". Although, as already outlined, a Calc model operator might be seen as an analog in the database domain, those operators lack the notion of a state. As a consequence, messages as an alternative to a classical data flow might be introduced to share state information between operators to orchestrate their operation. For example, running a Support Vector Machine would require to distribute the global support vectors after every step to compare them to the locally computed vectors. Although the exchange of such support vectors could be modeled as a data flow, explicit message passing would be worthwhile to represent and exchange the intermediate state of an algorithm. Message passing to allow synchronization of independently running tasks would be an extremely useful and powerful programming concept.

4.0 Examples

Two different use cases for calc skeletons are outlined. In a first step, it is shown how to "simulate" the well-known MapReduce programming paradigm. By using skeletons, the MapReduce programming world is able to be embraced and integrated into the HANA™ in memory database platform. A second use case illustrates the implementation of a typical problem coming from the data mining/information retrieval domain. In this example, skeletons are used to implement a document classifier, i.e. given a (large) set of documents, the algorithm assigns a document to a specific class.

4.1 Word Count

In order to show the "backward compatibility" of embodiments with the Map/Reduce programming model, now outlined is the "implementation" of the standard "Hello world!"-like program in Map/reduce. Given a large document, compute the word frequency. In a first step, the document is split into parts. Within a Map( ) function, the frequency of the words within an individual partition is computed. For the subsequent Reduce( ) function, the shuffle step of MapReduce partitions the set of local results coming from the Map( )-step with respect to the overall set of words. Within a Reduce( ) function, the local word frequencies are then aggregated to the overall word frequencies per document.

Figure 4:
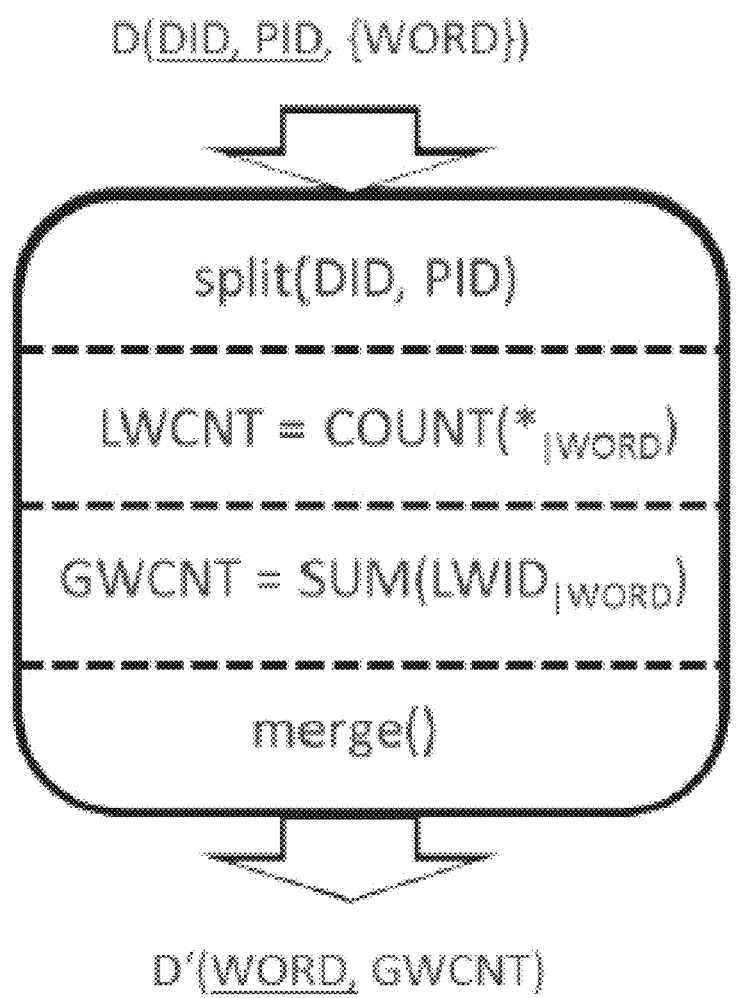
FIG. 4 shows a skeleton to implement WordCount via the MapReduce skeleton

FIG. 4 outlines the use of the MAP and REDUCE skeleton to express the Word Count example. After an initial split into partitions identified by PID, the first operation computes the local word count (LWCNT) for the individual document parts. This is followed by a global count by summing up the local count, again on a per word basis. The merge acts as a union, bringing the individual count results together for each document.

4.2 Document Classification

The problem setting of the second use case is to recognize the language of a given set of documents based on given text snippets. The input includes:

a (potentially large) set of documents $(x_1, \ldots, x_n)$ a set of different languages $(c_1, \ldots, c_m)$ with a set of characteristic properties $(l_1, \ldots, l_y)$ per language. In this example, the frequency of different letters is used as the main differentiator of a language, i.e. the properties $l_k$ represent the cardinality of the k-th letter in the alphabet.

FIG. 5A shows the pseudo code to train a naive Bayes classificator based on Gaussian distributions for different properties and different classes. The algorithm loops over all languages (classes). In a first step, the algorithm counts for a set of documents of a given language the occurrence of the individual letters. In a second phase, the algorithm determines—based on the absolute numbers—the mean and standard deviation plus the corresponding Gaussian distribution per letter.

After learning a model based on a training set of documents, the "apply" algorithm walks through documents of unknown language, computes the "fingerprint", i.e. the frequency of letters within a document and—in a simple case—assigns a document to a language class based on maximum likelihood. FIG. 5B shows the corresponding pseudo code of the algorithm. The algorithm computes the conditional probability for all letters in every document with respect to every language and finally picks the class with the highest probability.

Figure 6:
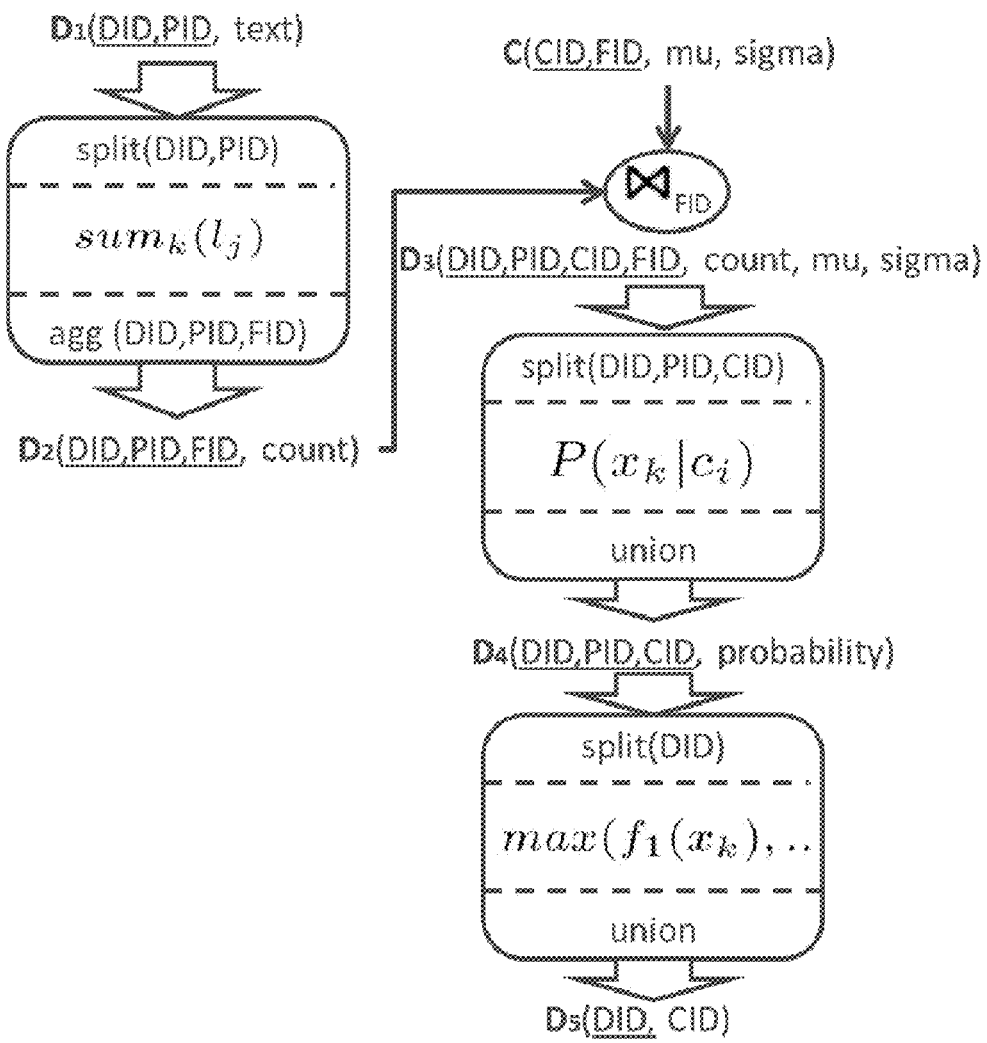
FIG. 6 shows the execution plan based on skeletons.

To implement this algorithm, multiple skeletons can be combined and finally instantiated into an executable query plan. FIG. 6 shows the execution plan based on skeletons. FIG. 5C shows script snippets to implement document language classification according to an embodiment. As can be seen, two input tables are used. Table $D_1$ holds text fragments (PID) of documents identified with DID. On the other side, Table C holds the trained model data, i.e. expected values and standard deviation for every language denoted by CID and every characteristic feature/letter denoted by FID.

The first skeleton denotes a partitioning by (DID and PID) and performs local summation of letter frequencies in the document fragments. This intermediate result is stored in table $D_2$ and joined with the model data based on the individual feature. The second skeleton takes the combined data stream and computes the conditional probabilities for all parts of the document and for all language classes in parallel. The third skeleton finally determines the highest probability per document and assigns the corresponding language class to the document (DID with CID).

A clear separation of programming and deployment of the application logic is observed. During the design of the solution, the programmer is able to focus on the logic and the finest partitioning criteria for every processing step. During deployment, it is the optimizer's duty to exploit the maximal degree of parallelism and minimize inter-process communication. For example, the use case provides an excellent opportunity to conduct the join operator in a co-located fashion, by locally combining partitions defined by (DID; PID; FID) on the one side and (CID; FID) on the other side. Based on the physical data representation (number of items, etc.), the optimizer may deploy the finest partitioning scheme or decide to use a more coarse-grained parallelization scheme.

4.3 Traveling Salesman Problem

As an example to exploit the Brand-and-Bound (BaB) skeleton, we consider the well-known traveling salesman problem and a solution based on the branch-and-bound algorithmic pattern. The general approach of BaB lies in dividing the problem space into partitions and trying to exclude certain partitions from the optimal solution for which the optimal solution does definitely not apply. Other partitions are recursively further partitioned into small chunks, tested using the objective function (or cost minimization function), and excluded from the potential solution space if feasible.

Consider S a subset of solutions and L(S) a lower bound of the costs for S. If the best solution with the lowest cost is smaller than L(S), there is no need to further explore any subset of S. Otherwise, S is recursively partitioned into a more fine-grained solution space and again the lower bound for this solution space is computed.

The traveling salesman problem (TSP) computes the tour with minimum length to visit a given set of cities (or points in the 2-dimensional space) exactly once. It is therefore considered an NP-hard problem. A lower bound for the TSP is given by: cost of any tour $$\geq 1/2 \times \sum_{v \in V}$$

Figure 7A:
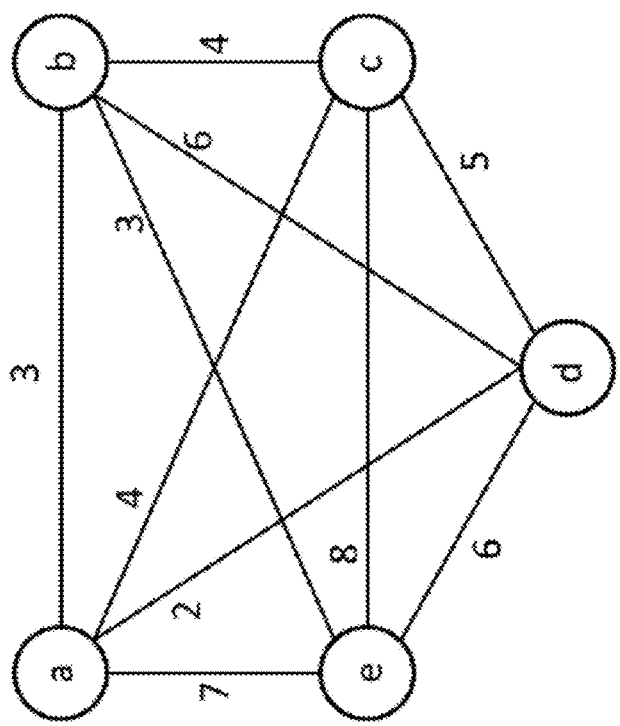
FIG. 7A outlines the computation of a lower bound for a given traveling salesman scenario.

(sum of costs of the two least cost edges adjacent to v). FIG. 7A outlines the computation of a lower bound for a given scenario. For example, taking node "a" as source node, nodes "d" and "b" reflect the cheapest target nodes with a cost of 2 and 3 respectively. In total the lower bound on the cost of any tour through the graph considering the cost of the two cheapest edges results in 17.5.

The algorithm explores the solution space by branching and stepwise extending the set of constraints. For example, a branch may decide to include or exclude an edge of the graph within the currently explored solution. After computing the cost for the solution following the scheme above, the algorithm may decide to further explore or prune the solution space (depending on the comparison of the cheapest with the current solution) by excluding of including certain edges.

Figure 7B:
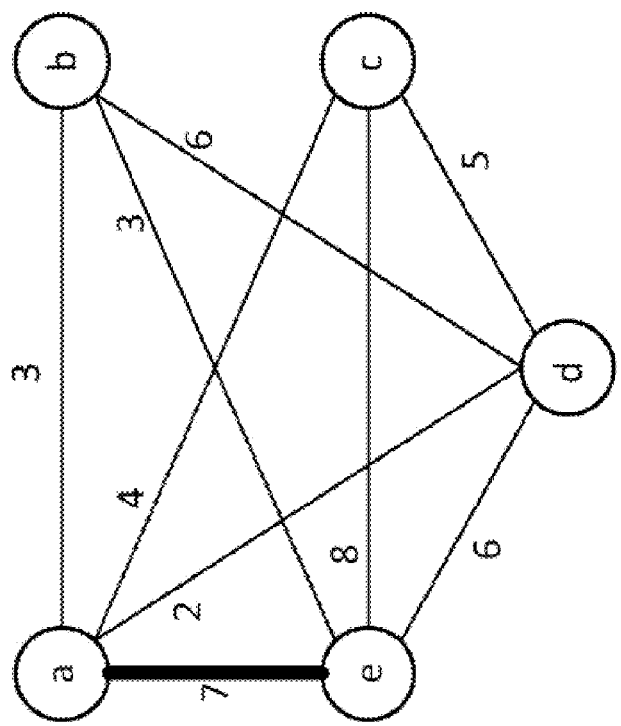
FIG. 7B shows a scenario of the example initially depicted in FIG. 7A.

FIG. 7B shows a scenario of the example initially depicted in FIG. 7A. In this situation, the algorithm has decided to force an inclusion of edge "a-e" and an exclusion of edge "b-c". Computing the lower bound based on this setup leads to cost changes in outgoing edges starting from node "a", "e" because of the forced inclusion of edge "a-e" and node "c" because of the forced exclusion of edge "b-c". The computation of the lower bound yields 20.5, which is compared to the already lowest bound. If the current solution is better than the already existing solution, the algorithm branches again by forcing an edge to be included or excluded.

With reference to the general pattern shown in FIG. 3F, the following four (4) methods may be implemented accordingly.

The branch( ) method creates—based on a current solution—two new candidates by selecting an edge to be included or excluded.

The bound( ) method computes the lower bound cost for the current scenario following the principle outlined above.

The betterThan( ) method returns whether none, one, or both alternatives should be further explored.

The isSolution( ) method returns true, if the currently explored scenario should be discarded.

While the above description has focused upon implementation in connection with the HANA™ database offering the imperative L language, alternative embodiments could be used with other database management products that offer imperative languages. Examples can include those database management products offering imperative languages in the form of stored procedures in the C++ or JAVA programming languages, to execute custom logic within the database engine.

Figure 8:
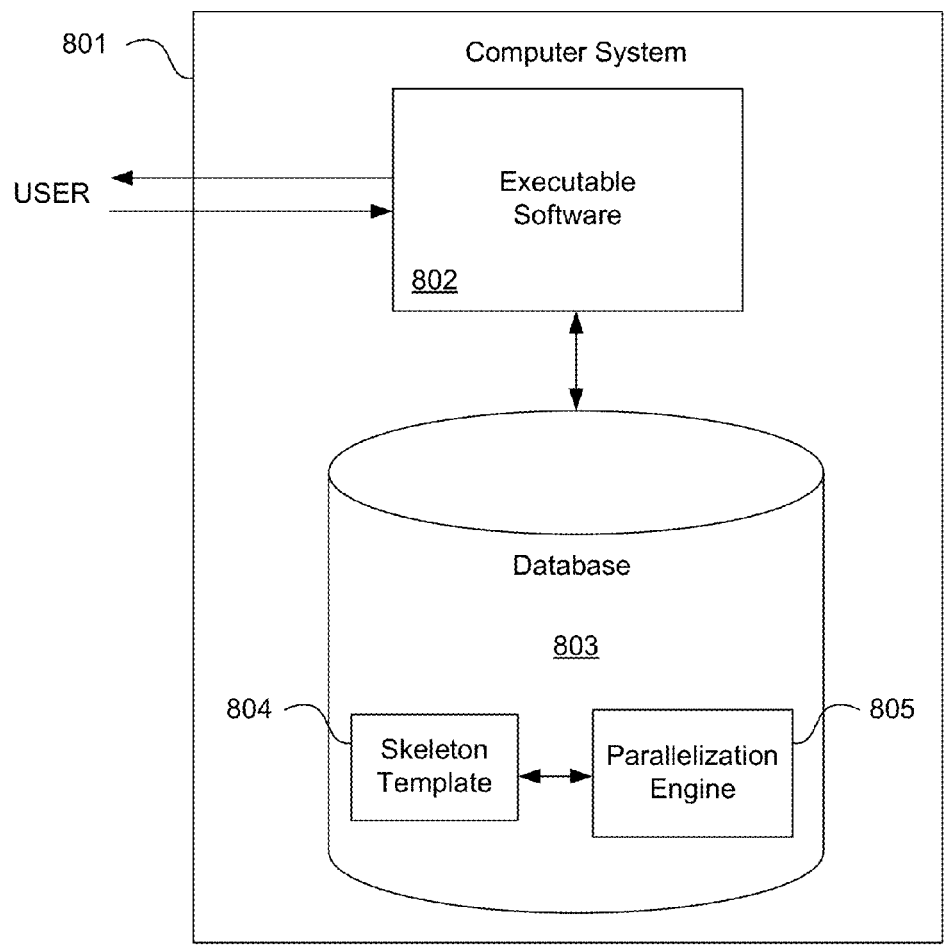
FIG. 8 illustrates hardware of a special purpose computing machine configured to perform parallel execution according to an embodiment.

FIG. 8 illustrates hardware of a special purpose computing machine configured to perform parallel execution according to an embodiment. In particular, computer system 800 comprises a processor 802 that is in electronic communication with a non-transitory computer-readable storage medium 803. This computer-readable storage medium has stored thereon code 805 corresponding to a parallelization engine. Code 804 corresponds to a skeleton template. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 9:
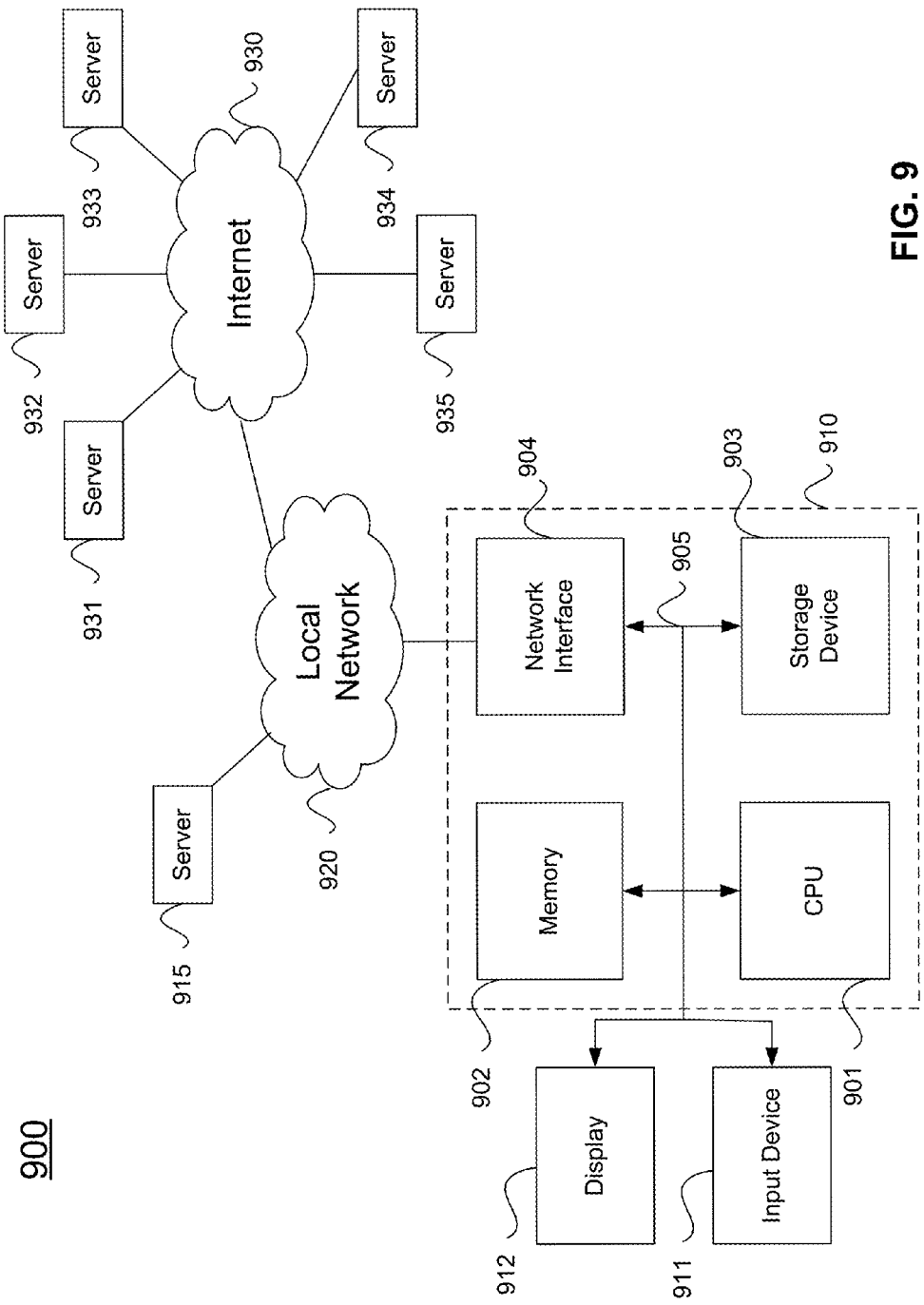
FIG. 9 illustrates an example of a computer system.

An example computer system 910 is illustrated in FIG. 9. Computer system 910 includes a bus 905 or other communication mechanism for communicating information, and a processor 901 coupled with bus 905 for processing information. Computer system 910 also includes a memory 902 coupled to bus 905 for storing information and instructions to be executed by processor 901, including information and instructions for performing the techniques described above, for example. This memory may also be used for storing variables or other intermediate information during execution of instructions to be executed by processor 901. Possible implementations of this memory may be, but are not limited to, random access memory (RAM), read only memory (ROM), or both. A storage device 903 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 903 may include source code, binary code, or software files for performing the techniques above, for example. Storage device and memory are both examples of computer readable mediums.

Computer system 910 may be coupled via bus 905 to a display 912, such as a cathode ray tube (CRT) or liquid crystal display (LCD), for displaying information to a computer user. An input device 611 such as a keyboard and/or mouse is coupled to bus 905 for communicating information and command selections from the user to processor 901. The combination of these components allows the user to communicate with the system. In some systems, bus 905 may be divided into multiple specialized buses.

Computer system 910 also includes a network interface 904 coupled with bus 905. Network interface 904 may provide two-way data communication between computer system 910 and the local network 920. The network interface 904 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 904 sends and receives electrical, electromagnetic, or optical signals that carry digital data streams representing various types of information.

Computer system 910 can send and receive information, including messages or other interface actions, through the network interface 904 across a local network 920, an Intranet, or the Internet 930. For a local network, computer system (10 may communicate with a plurality of other computer machines, such as server 915. Accordingly, computer system 910 and server computer systems represented by server 915 may form a cloud computing network, which may be programmed with processes described herein. In the Internet example, software components or services may reside on multiple different computer systems 910 or servers 931-935 across the network. The processes described above may be implemented on one or more servers, for example. A server 931 may transmit actions or messages from one component, through Internet 930, local network 920, and network interface 904 to a component on computer system 910. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:
1. A computer-implemented method comprising:
   providing an in-memory database layer comprising a calculation model including a plurality of generic operators;
   providing in the in-memory database layer, a skeleton template set describing parallel execution of the plurality of generic operators, wherein the skeleton template set includes a skeleton template exhibiting a branch and bound structure;
   an in-memory database engine receiving a query;
   the in-memory database engine referencing the calculation model and the skeleton template to execute the query in parallel according to a skeleton instance including a custom operator having a parameter provided by the query; and
   displaying to a user, a result of executing the query on the in-memory database.
2. A method as in claim 1 wherein the in-memory database engine leverages an internal structure of the custom operator to create the parameter.
3. A method as in claim 2 wherein the parameter comprises a table name, a column name, or a specific value in a filter condition.
4. A method as in claim 2 wherein:
   the custom operator comprises aggregation without grouping criteria; and
   the parameter comprises a grouping attribute.
5. A method as in claim 1 wherein the in-memory database engine infers information about an execution environment.

6. A method as in claim 5 wherein the in-memory database engine infers the information from a unique number of a current thread.

7. A method as in claim 1 wherein the custom operator is written in C++.

8. A non-transitory computer readable storage medium embodying a computer program for performing a method, said method comprising:
- providing an in-memory database layer comprising a calculation model including a plurality of generic operators;
- providing in the in-memory database layer, a skeleton template set describing parallel execution of the plurality of generic operators, wherein the skeleton template set includes a skeleton template exhibiting a branch and bound structure;
- an in-memory database engine receiving a query;
- the in-memory database engine referencing the calculation model and the skeleton template to execute the query in parallel according to a skeleton instance including a custom operator having a parameter provided by the query, the in-memory database engine leveraging an internal structure of the custom operator to generate the parameter; and
- displaying to a user, a result of executing the query on the in-memory database.

9. A non-transitory computer readable storage medium as in claim 8 wherein the parameter comprises a table name, a column name, or a specific value in a filter condition.

10. A non-transitory computer readable storage medium as in claim 8 wherein:
- the custom operator comprises aggregation without grouping criteria; and
- the parameter comprises a grouping attribute.

11. A non-transitory computer readable storage medium as in claim 8 wherein the in-memory database engine infers information about an execution environment.

12. A non-transitory computer readable storage medium as in claim 11 wherein the in-memory database engine infers the information from a unique number of a current thread.

13. A computer system comprising:
- one or more processors;
- a software program, executable on said computer system, the software program configured to:
- provide an in-memory database layer comprising a calculation model including a plurality of generic operators;
- provide in the in-memory database layer, a skeleton template set describing parallel execution of the plurality of generic operators, wherein the skeleton template set includes a skeleton template exhibiting a branch and bound structure;
- cause the in-memory database engine to receive a query;
- cause the in-memory database engine to reference the calculation model and the skeleton template to execute the query in parallel according to a skeleton instance including a custom C++ operator having a parameter provided by the query; and
- display to a user, a result of executing the query on the in-memory database.

14. A computer system as in claim 13 wherein the software program causes the in-memory database engine to leverage an internal structure of the custom operator to create the parameter.

15. A computer system as in claim 14 wherein the parameter comprises a table name, a column name, or a specific value in a filter condition.

16. A computer system as in claim 14 wherein:
- the custom operator comprises aggregation without grouping criteria; and
- the parameter comprises a grouping attribute.

17. A computer system as in claim 13 wherein the computer program causes the in-memory database engine to infers information about an execution environment from a unique number of a current thread.

* * * * *